US010796532B2

(12) United States Patent
Herring et al.

(10) Patent No.: US 10,796,532 B2
(45) Date of Patent: *Oct. 6, 2020

(54) SYSTEM EXECUTING A META-GAME AND A VIRTUAL ENVIRONMENT

(71) Applicant: Chill Gaming Pty Ltd, Southbank VIC (AU)

(72) Inventors: Peter James Herring, Box Hill South (AU); Joseph Ronald Crepaldi, Potts Point (AU); Andrew Wyer, Glen Iris (AU); Daryl Bridges, Selby (AU); Daryl Leigh Bruce, Croydon South (AU); Simon David Riley, Ringwood East (AU)

(*) Notice: Subject to any disclaimer, the term of this patent is extended or adjusted under 35 U.S.C. 154(b) by 0 days.

This patent is subject to a terminal disclaimer.

(21) Appl. No.: 15/607,384

(22) Filed: May 26, 2017

(65) Prior Publication Data
US 2017/0333793 A1 Nov. 23, 2017

Related U.S. Application Data

(63) Continuation of application No. PCT/AU2017/050206, filed on Mar. 8, 2017.

(30) Foreign Application Priority Data

Mar. 8, 2016 (AU) .............................. 2016900870
May 3, 2016 (AU) .............................. 2016901624

(51) Int. Cl.
*G07F 17/32* (2006.01)
*A63F 13/45* (2014.01)
(Continued)

(52) U.S. Cl.
CPC .......... *G07F 17/3267* (2013.01); *A63F 13/20* (2014.09); *A63F 13/2145* (2014.09);
(Continued)

(58) Field of Classification Search
CPC ............. G07F 17/3225; G07F 17/3267; G07F 17/3209; G07F 17/3213; G07F 17/3246;
(Continued)

(56) References Cited

U.S. PATENT DOCUMENTS 3,557,324 A 1/1971 Nakamatsu
4,214,298 A 7/1980 Propst et al.
(Continued)

FOREIGN PATENT DOCUMENTS

WO WO 2013/184860 12/2013

OTHER PUBLICATIONS

International Search Report and Written Opinion in International Application No. PCT/AU2017/050795, Notification dated Oct. 10, 2017.

*Primary Examiner* — Malina D. Blaise
(74) *Attorney, Agent, or Firm* — Knobbe Martens Olson & Bear LLP

(57) ABSTRACT

Some embodiments relate to a computing system including a virtual environment hosting a player avatar, comprising: at least one processor; memory storing executable program code; at least one display to display game-related images; and input components to receive player input. The at least one processor is configured to execute the program code to: execute a first game in response to player input, the first game being a game of chance; execute a meta-game, wherein the meta-game defines at least one meta-game objective and wherein progression through the meta-game towards the at least one meta-game objective is related to results of game play in the first game, wherein a theme of the meta-game is associated with the virtual environment, and wherein the first game is executed simultaneously with the meta-game; generate a virtual environment; and present a player avatar on the display within the virtual environment.

19 Claims, 21 Drawing Sheets

(51) Int. Cl.
*A63F 13/2145* (2014.01)
*A63F 13/25* (2014.01)
*A63F 13/35* (2014.01)
*A63F 13/40* (2014.01)
*A63F 13/52* (2014.01)
*A63F 13/20* (2014.01)
*A63F 13/79* (2014.01)
*G07F 17/34* (2006.01)

(52) U.S. Cl.
CPC .............. *A63F 13/25* (2014.09); *A63F 13/35* (2014.09); *A63F 13/40* (2014.09); *A63F 13/45* (2014.09); *A63F 13/52* (2014.09); *A63F 13/79* (2014.09); *G07F 17/3209* (2013.01); *G07F 17/3213* (2013.01); *G07F 17/3225* (2013.01); *G07F 17/3246* (2013.01); *G07F 17/3248* (2013.01); *G07F 17/3258* (2013.01); *G07F 17/3269* (2013.01); *G07F 17/3288* (2013.01); *G07F 17/3295* (2013.01); *G07F 17/34* (2013.01)

(58) Field of Classification Search
CPC ............. G07F 17/3248; G07F 17/3258; G07F 17/3269; G07F 17/3288; G07F 17/3295; G07F 17/34; A63F 1/00; A63F 13/20; A63F 13/2145; A63F 13/35; A63F 13/25; A63F 13/40; A63F 13/45; A63F 13/52; A63F 13/79
See application file for complete search history.

(56) References Cited

U.S. PATENT DOCUMENTS

| | | |
|---|---|---|
| 4,998,283 A | 3/1991 | Nishida et al. |
| 5,119,429 A | 6/1992 | Chatelain |
| 5,274,709 A | 12/1993 | Koizumi |
| 5,452,025 A | 9/1995 | Koizumi |
| 5,524,062 A | 6/1996 | Oh |
| 5,710,394 A | 1/1998 | Saito et al. |
| 5,821,471 A | 10/1998 | McCuller |
| 5,898,137 A | 4/1999 | Saito |
| 6,035,051 A | 3/2000 | Sato |
| 6,298,942 B1 | 10/2001 | Schlatmann et al. |
| 6,324,052 B1 | 11/2001 | Azima et al. |
| 6,335,974 B1 | 1/2002 | Kunimoto |
| 6,468,162 B1 | 10/2002 | Nakamura |
| 7,471,804 B2 | 12/2008 | Lee |
| 8,282,489 B2 | 10/2012 | Arezina et al. |
| 8,702,521 B2 | 4/2014 | Wilm |
| 9,486,704 B2 * | 11/2016 | Nguyen .............. G07F 17/3225 |
| 9,685,038 B2 | 6/2017 | Mikoshiba et al. |
| 2003/0235320 A1 | 12/2003 | Hirschhorn |
| 2004/0053699 A1 | 3/2004 | Rasmussen et al. |
| 2004/0152521 A1 | 8/2004 | Shinoda |
| 2004/0166913 A1 | 8/2004 | Shinoda |
| 2005/0047617 A1 | 3/2005 | Lee |
| 2006/0093133 A1 | 5/2006 | Park et al. |
| 2007/0223763 A1 | 9/2007 | Bienek et al. |
| 2007/0259713 A1* | 11/2007 | Fiden ..................... G07F 17/32 463/25 |
| 2007/0274547 A1 | 11/2007 | Ueno |
| 2009/0034759 A1 | 2/2009 | Ko et al. |
| 2009/0270168 A1 | 10/2009 | Englman et al. |
| 2010/0210364 A1* | 8/2010 | York ..................... A63F 13/12 463/43 |
| 2010/0248818 A1* | 9/2010 | Aoki ................... G07F 17/3267 463/25 |
| 2011/0143834 A1* | 6/2011 | Guinn ................. G07F 17/3281 463/25 |
| 2011/0212766 A1 | 9/2011 | Bowers et al. |
| 2011/0244935 A1 | 10/2011 | Matthews et al. |
| 2011/0244952 A1* | 10/2011 | Schueller ............ G07F 17/3262 463/27 |
| 2012/0115580 A1* | 5/2012 | Hornik ................ G07F 17/3258 463/25 |
| 2012/0115593 A1* | 5/2012 | Vann .................... G07F 17/3244 463/26 |
| 2012/0115594 A1* | 5/2012 | Hornik ................ G07F 17/3258 463/27 |
| 2012/0322564 A1 | 12/2012 | Granger et al. |
| 2013/0016864 A1 | 1/2013 | Ivey et al. |
| 2014/0093114 A1 | 4/2014 | Nguyen et al. |
| 2014/0269207 A1 | 9/2014 | Baym et al. |
| 2014/0269214 A1 | 9/2014 | Baym et al. |
| 2014/0328491 A1 | 11/2014 | Slotte |
| 2014/0378195 A1* | 12/2014 | Lee ..................... G07F 17/3276 463/7 |
| 2015/0287264 A1* | 10/2015 | De Viveiros Ortiz ....................... G07F 17/3295 463/25 |
| 2016/0171827 A1* | 6/2016 | Washington .......... A63F 13/822 463/22 |
| 2016/0171835 A1* | 6/2016 | Washington .......... A63F 13/822 463/25 |
| 2016/0240037 A1* | 8/2016 | Robbins .............. G07F 17/3225 |
| 2017/0046921 A1* | 2/2017 | Bennett .............. G07F 17/3241 |
| 2017/0333785 A1 | 11/2017 | Herring et al. |
| 2017/0337776 A1 | 11/2017 | Herring et al. |
| 2018/0160219 A1 | 6/2018 | Englert |
| 2018/0310095 A1 | 10/2018 | Wyer et al. |
| 2019/0180553 A1 | 2/2019 | Herring et al. |

\* cited by examiner

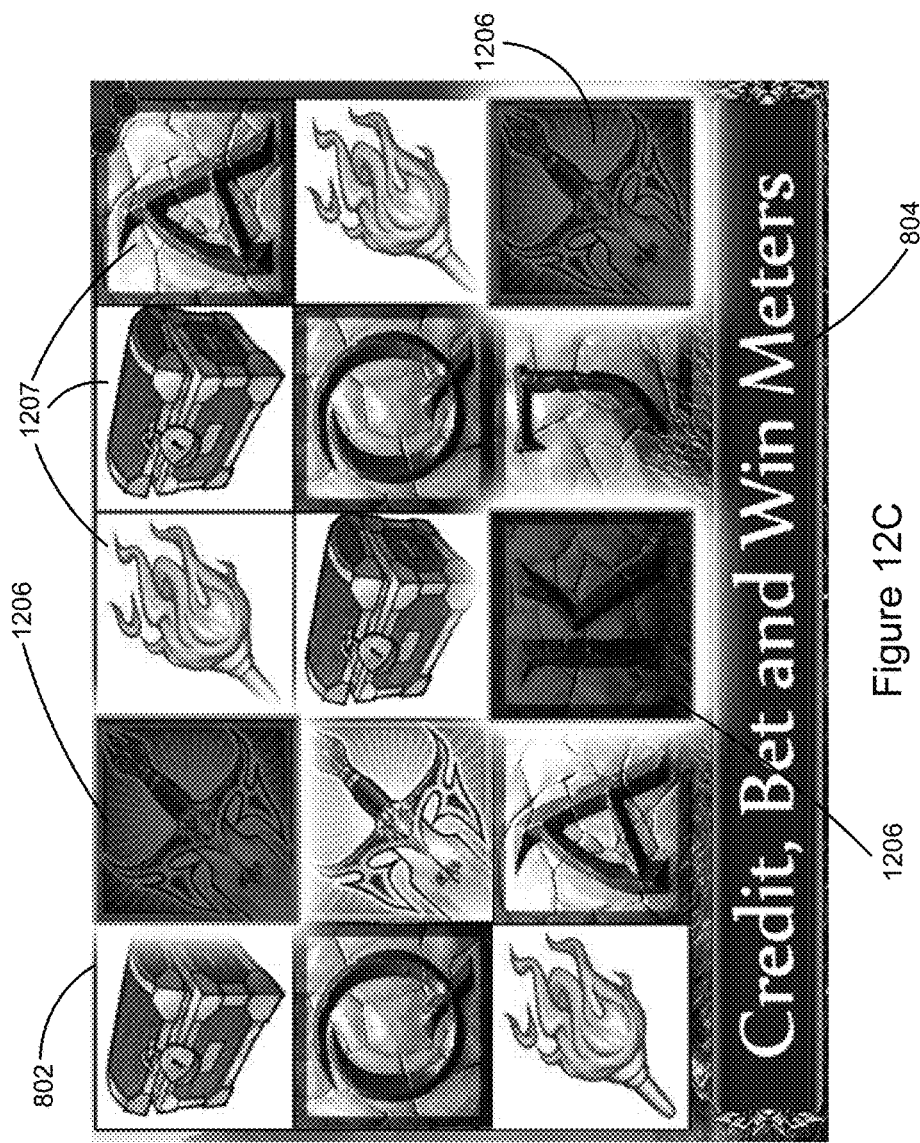
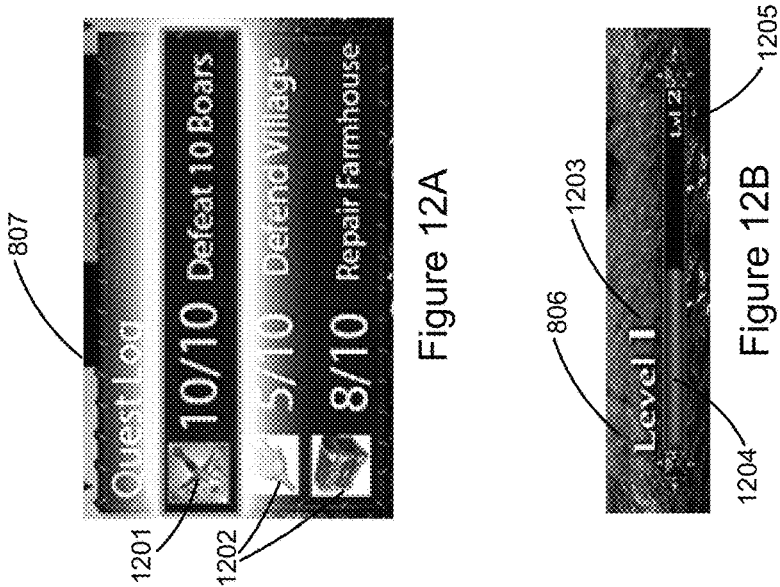
Figure 12A
Figure 12B
Figure 12C

SYSTEM EXECUTING A META-GAME AND A VIRTUAL ENVIRONMENT

CROSS-REFERENCE TO RELATED APPLICATIONS

The present application is a continuation of International Patent Application No. PCT/AU2017/050206, filed on 8 Mar. 2017 and entitled "Gaming method, system and machine comprising multiple games", the entire contents of which is hereby incorporated by reference. PCT/AU2017/050206 claims the benefit of Australian Provisional Patent Application No. 2016900870 filed 8 Mar. 2016, and Australian Provisional Patent Application No. 2016901624 filed 3 May 2016, the entire contents of both of which are hereby incorporated by reference.

TECHNICAL FIELD

The present disclosure relates to an improved method, system and machine capable of presenting a virtual environment.

BACKGROUND

Some systems reward users based on chance. However, such systems can become repetitive and frustrating to some users.

It is desired to address or ameliorate one or more shortcomings or disadvantages associated with prior methods, systems and machines, or to at least provide a useful alternative thereto.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to a computing system including a virtual environment hosting a player avatar, comprising:
at least one processor;
memory storing executable program code;
at least one display to display game-related images; and
input components to receive player input;
wherein the at least one processor is configured to execute the program code to:
execute a first game in response to player input, the first game being a game of chance;
execute a meta-game, wherein the meta-game defines at least one meta-game objective and wherein progression through the meta-game towards the at least one meta-game objective is related to results of game play in the first game, wherein a theme of the meta-game is associated with the virtual environment, and wherein the first game is executed simultaneously with the meta-game;
generate a virtual environment; and
present a player avatar on the display within the virtual environment.

Some embodiments relate to a gaming machine, comprising:
at least one processor;
memory storing executable program code;
at least one display to display game-related images; and
input components to receive player input;
wherein the at least one processor is configured to execute the program code to:
execute a first game of chance in response to player input, the first game being a game of chance;
execute a meta-game, wherein the meta-game defines at least one meta-game objective and wherein progression through the meta-game towards the at least one meta-game objective is based on results of game play in the first game.

The first game may be executed simultaneously with the meta-game. The first game may be executed before the meta-game. The first game may be executed after the meta-game.

The gaming machine of any one of claims 1 to 4, wherein progression through the meta-game towards the at least one meta-game objective may be based on results of game play in the game of chance.

Progression through the meta-game towards the at least one meta-game objective may be based on results of game play in the game of chance The results of game play in the game of chance may be based on progression through the meta-game.

The at least one processor may be configured to execute the program code to execute a second game that involves application of player skill. The second game may be executed only after at least one game play of the first game. At least one aspect of game play in the second game may be affected by achievement of the at least one meta-game objective.

The first game may be executed only after at least one game play of the second game. The achievement of at least one meta-game objective may be affected by at least one aspect of game play in the second game.

The meta-game and the second game may share a common theme. The second game may allow user control of a game avatar to participate in the second game.

Achievement of the at least one meta-game objective may affect at least one attribute of the game avatar. Achievement of the at least one meta-game objective may contribute to advancement of the game avatar towards a game avatar advancement milestone.

A first winning result in game play of the first game may contribute to achievement of the at least one meta-game objective. The at least one meta-game objective may comprise a plurality of meta-game objectives. The first winning result may be one of a set of possible first winning results.

A second winning result in game play of the first game may contribute to or result in monetary reward to a game player. The second winning result may be one of a set of possible second winning results. The first winning result may not directly result in monetary reward to a game player.

A third winning result in the second game may depend at least in part on player skill. The third winning result may result in a monetary reward to a game player. The third winning result may result in a non-monetary reward to the game player. The non-monetary reward may comprise at least one additional attribute or increased attribute of a game avatar.

Exercise of player skill in controlling the game avatar within a virtual environment of the second game may be required to achieve the third winning result. The virtual environment of the second game may comprise a navigable environment in which actions of the game avatar can be controlled by received player input.

The first game may comprise a reel game in which a single game play results in random selection of a set of symbols for display on the display means. Progression toward achievement of each of the at least one meta-game objectives may be advanced by occurrence of at least one predetermined symbol selection within the set of symbols.

Progression in the at least one meta-game may not be dependent on received player input.

The at least one processor may be configured to execute the program code to initiate the second game according to a timing criterion that is independent of progression towards the at least one meta-game objective. When the timing criterion is satisfied, the at least one processor may allow receipt of player input to initiate the second game.

Some embodiments relate to a method of executing game play on a gaming machine, the method comprising:
 executing a first game of chance in response to player input, the first game being a game of chance; and
 executing a meta-game, wherein the meta-game defines at least one meta-game objective and wherein progression through the meta-game towards the at least one meta-game objective is related to game play in the first game.

The first game may be executed with the meta-game. The first game may be executed before the meta-game. The first game may be executed sequentially after the meta-game.

Progression through the meta-game towards the at least one meta-game objective may be based on results of game play in the game of chance. Results of game play in the game of chance may be based on progression through the meta-game.

The gaming machine may comprise at least one processor, memory storing executable program code, at least one display to display game-related images, and input components to receive player input.

The method may further comprise executing a second game that involves application of player skill.

The step of executing the second game may only be performed only after at least one game play of the first game. At least one aspect of game play in the second game may be affected by achievement of the at least one meta-game objective.

The first game may be executed only after at least one game play of the second game. The achievement of at least one meta-game objective may be affected by at least one aspect of game play in the second game.

The meta-game and the second game may share a common theme. The second game may allow user control of a game avatar. The method may further comprise modifying at least one attribute of the game avatar in response to achievement of the at least one meta-game objective. The method may further comprise advancing the game avatar towards a game avatar advancement milestone in response to achievement of the at least one meta-game objective.

The method may further comprise causing achievement of the at least one meta-game objective in response to a first winning result in game play of the first game. The at least one meta-game objective may comprise a plurality of meta-game objectives.

The first winning result may be one of a set of possible first winning results.

The method may further comprise awarding a monetary reward to a game player in response to a second winning result in game play of the first game. The second winning result may be one of a set of possible second winning results.

The first winning result may not directly result in monetary reward to a game player.

A third winning result in the second game may depend at least in part on player skill. The method may further comprise awarding a monetary reward to a game player in response to the third winning result. The method may further comprise awarding a non-monetary reward to a game player in response to the third winning result. The non-monetary reward may comprise at least one additional attribute or increased attribute of a game avatar.

Exercise of player skill in controlling the game avatar within a virtual environment of the second game may be required to achieve the third winning result.

The virtual environment of the second game may comprise a navigable environment in which actions of the game avatar can be controlled by received player input.

The first game may comprise a reel game in which a single game play results in random selection of a set of symbols for display on the display means.

The method may further comprise advancing progression toward achievement of each of the at least one meta-game objectives in response to an occurrence of at least one predetermined symbol selection within the set of symbols.

Progression in the at least one meta-game may not be dependent on received player input.

The method may further comprise initiating the second game according to a timing criterion that is independent of progression towards the at least one meta-game objective. The method may further comprise allowing receipt of player input to initiate the second game when the timing criterion is satisfied.

Some embodiments relate to a non-transitory computer-readable medium including contents that are configured, when executed, to cause a host computing system to perform the method according to some other embodiments.

BRIEF DESCRIPTION OF DRAWINGS

Embodiments are described below in further detail and by way of example, with reference to the accompanying drawing, in which:

FIG. 12A is an example screenshot of a meta-game task screen showing a task being completed;

FIG. 12B is a detailed view of an example player level bar portion of the base game screen;

FIG. 12C is an example screenshot of the base game screen highlighting a winning meta-game combination;

DESCRIPTION OF EMBODIMENTS

Figure 1:
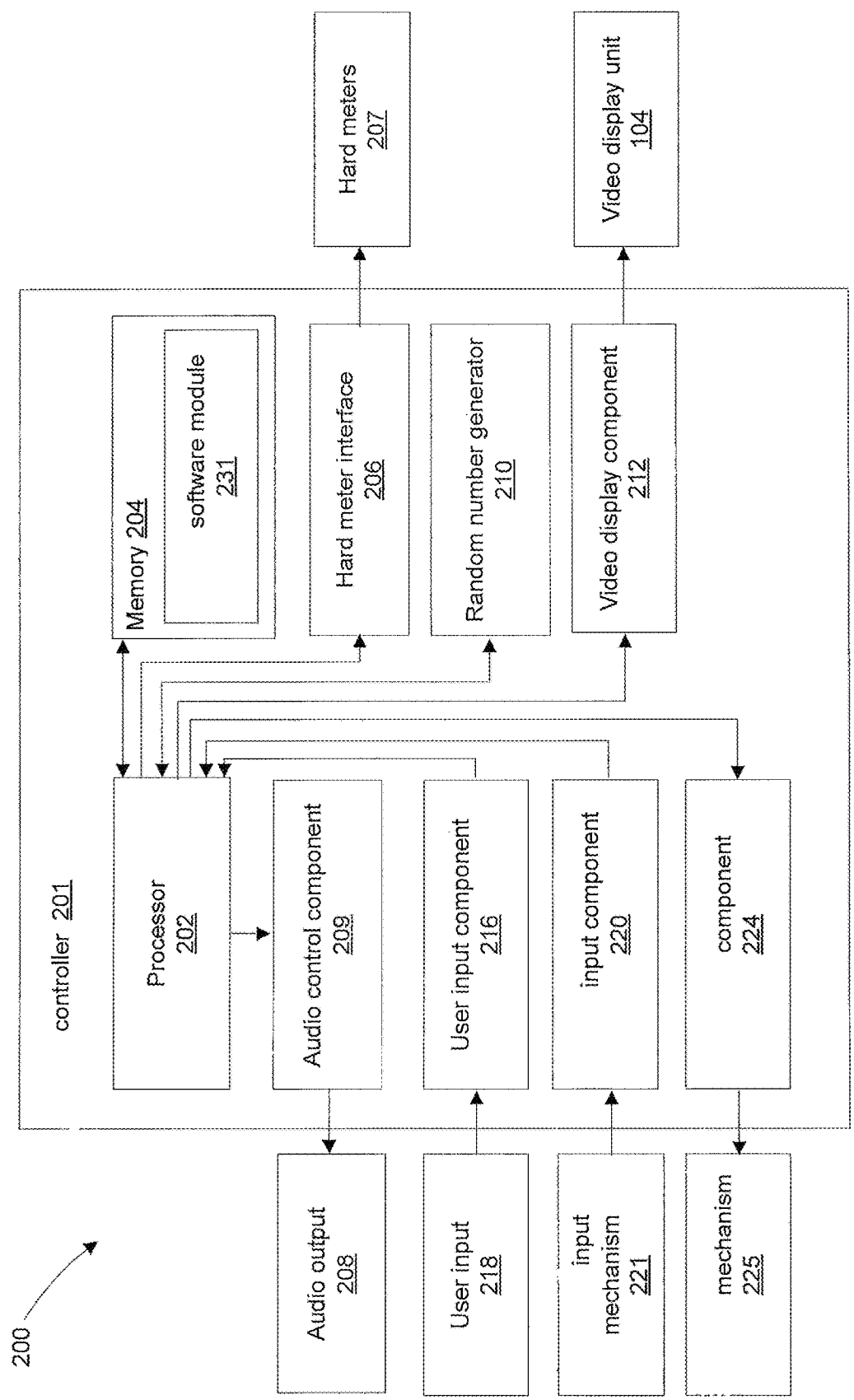
FIG. 1 is a schematic block diagram of core components of the gaming system of FIG. 2.

Described embodiments generally relate to a gaming machine. The gaming system can take a number of different forms. In a first form, a stand-alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in standalone gaming machine mode, "thick client" mode or "thin client" mode depending on the game being played, operating conditions, and so on.

Reel-style gaming machines allow players to make bets on symbols that appear on the real or virtual reels, offering awards to players based on the combinations of symbols that appear. These games appeal to players as a way of winning cash or credits. However, reel-style games have limited appeal to some players.

It is desired to address or ameliorate one or more shortcomings or disadvantages associated with prior methods, systems and machines for gaming, or to at least provide a useful alternative thereto.

Irrespective of the form, the gaming system 100 has several core components. At the broadest level, the core components comprise a player interface and a game controller. The player interface is arranged to enable interaction between a player and the gaming system and for this purpose includes input/output components required for the player to enter instructions and play the game. For example, the input/output components may include a credit mechanism to enable a player to input credits and receive payouts, one or more displays which may comprise a touch screen, and a game play mechanism arranged to enable a player to input game playing instructions. The game controller is in data communication with the player interface and typically comprises a processor arranged to process game play instructions and output game player outcomes to the one or more displays. It will be understood that in the present specification, the term "processor" refers generally to any device that can process game play instructions and may include a microprocessor, microcontroller, programmable logic device or any computational device such as a personal computer or a server.

Figure 2:
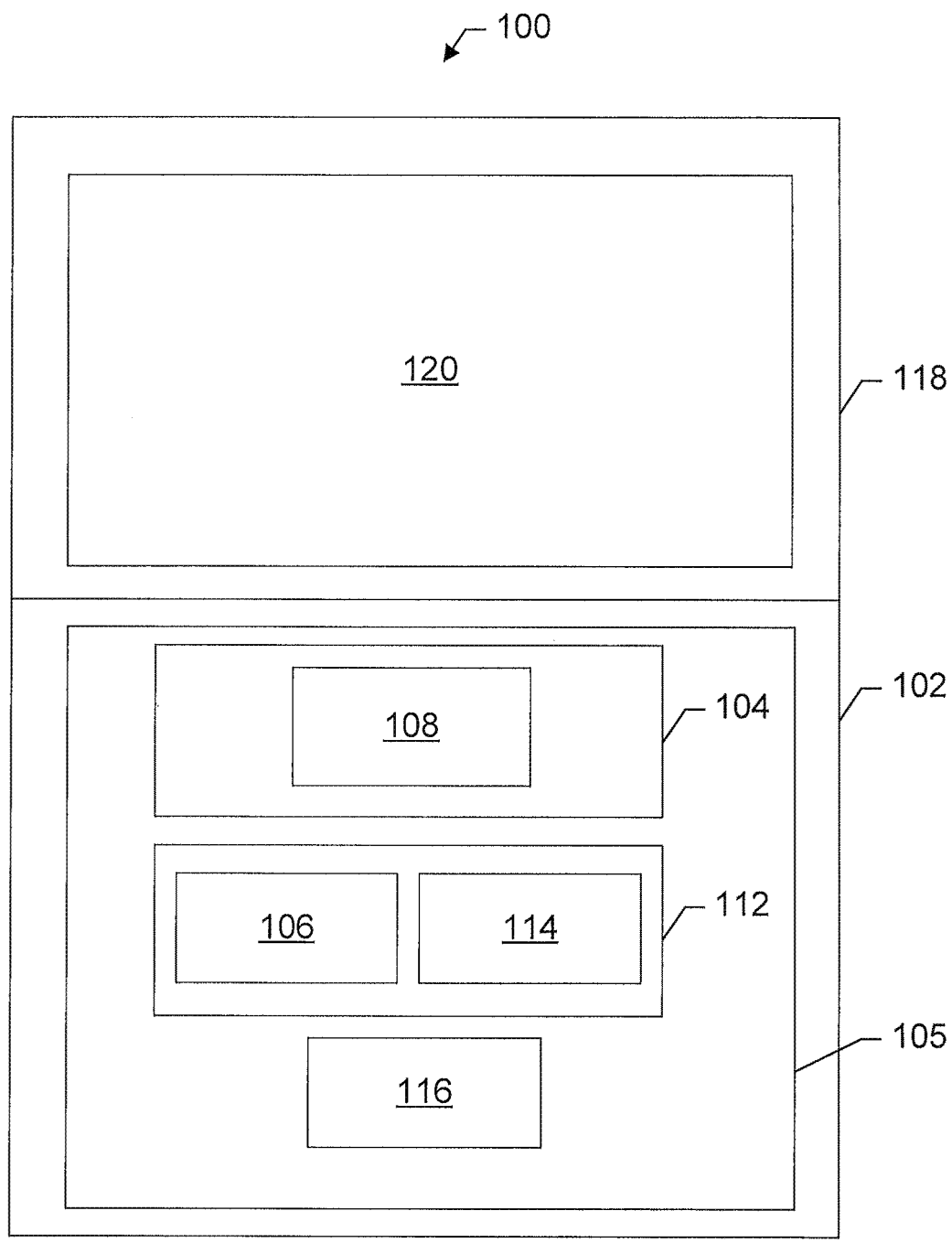
FIG. 2 is a diagrammatic representation of a gaming system in accordance with some embodiments, implemented in the form of a stand-alone gaming machine.

Referring now to FIG. 2, reference numeral 100 generally designates a stand-alone gaming system including a game. Hereinafter, the stand-alone gaming system 100 will be referred to as a gaming machine.

The gaming machine 100 includes a console 102 which contains all or most components required to implement a game play whereby, at least during part of the game play, a player wins or loses a wager. Access to the components is by way of a hinged door 105. Mounted to the exterior of the console 102 is a display means in the form of at least one visual display unit 104 on which one or more games is played. The video display unit 104 may be implemented as a liquid crystal display, a plasma screen, or other high quality digital video display. While the console 102 illustrated in FIG. 2 shows a single visual display unit 104, there may be more than one visual display unit on a gaming machine 100. For example, in some embodiments, gaming machine 100 may have one visual display unit 104 for displaying the game being played, and an additional visual display unit in the form of artwork 120 (described below) for displaying advertising or other material. In some embodiments, the additional visual display unit may be a video display unit. What is displayed on the visual display unit 104 will depend on what the intended goal of the unit is in relation to the player and any other potential participants in the gaming system. In some embodiments, a plurality of gaming machines 100 may communicate with a central display screen (not shown), which may allow for portions of gameplay to be displayed to a wider audience in a gaming venue.

In this example, the gaming machine 100 includes a tactile input for a player to interact via touch with the gaming machine 100. The tactile input may be in the form of a combination of pushbuttons 106 and a touch screen 108 for enabling a player to play one or more games. The touch screen 108 is an electronic visual display that can detect the presence and location of a touch within the display area. The touch screen 108 may be used during game setup, user browsing, or during the game play between start of a game and the end of a game, for example. Certain functions of the pushbutton are: initiation of game play, credit output, gameplay selection, completion of gameplay etc. A midtrim 112 of the machine 100 houses the pushbuttons 106.

The tactile input may optionally or further include a joystick (not shown) comprising a stick that pivots on a base and reports its angle or direction to the device it is controlling. The tactile input may optionally or further include a trackpad/touchpad (not shown) being a pointing device featuring a tactile sensor to translate the motion and position of a user's fingers to a relative position on screen. In some embodiments, tactile input may further include a keyboard, electronic mouse, or other input mechanism. In some embodiments, the user interface may be a user configurable interface having multiple user input options. It should be appreciated that tactile input may include any suitable device that enables the player to produce an input signal that is received by the processor 202 (see FIG. 1).

The midtrim 112 may house a credit input mechanism 221 including a bill collector 114. The credit input mechanism 221 may alternatively or additionally include a coin input chute, a card and/or ticket reader, a magnetic reading head for reading a magnetic stripe card, an electronic reader for a proximity card, a near field communications reader or any other form of electronic, wireless or contact that can input credit to the gaming machine.

A payout mechanism 225 including a coin tray 116 may be mounted beneath the console 102 and is provided for cash or other payouts from the machine 100 to the player. A hopper device (not shown) is provided which dispenses coins, or tokens equal to the amount of credit currently on the machine, into the coin tray 116. Aside from the coin tray 116, payout mechanism 225 may alternatively or additionally include a ticket dispenser for issuing a ticket dispensed by a printer which the user can redeem for cash, a note dispenser, a near field communications transmitter or means to enable remote credit transfer. Other suitable payout mechanisms, such as fund transfers to the player's electronically recordable identification card or smart card, may be implemented in accordance with described embodiments.

The gaming machine 100 includes a top box 118 on which artwork 120 or other images may be carried in the form of electronic visual display units. The artwork 120 could also comprise physical materials such as paper, plastic banners or posters. The artwork 120 may have generic information related to the machine or gaming system or the artwork 120 may be specifically made for a particular game to be played on the machine 100. While the artwork 120 is shown as being carried on the top box 118, the art work 120 can also be positioned in or on the bottom panel of the door 105, or any other part of the gaming machine 100 visible to the player. In some embodiments, artwork 120 may be a second digital display, which may show jackpot information, for example, or other supplemental video.

The gaming machine 100 further includes an auditory unit in the form of auditory output 208 (see FIG. 1) to provide auditory feedback to the player of the gaming machine 100.

Referring to FIG. 1, game logic circuitry 200 is illustrated. The game logic circuitry 200 includes a gaming controller 201 (otherwise referred to as a logic cage). As will be appreciated by those skilled in the gaming industry, the logic cage 201 includes a box-like mechanical structure that has slots to guide logic cards into the proper location for electronically plugging into a backplane mounted at the rear of the cage structure. The logic cards may contain hardware configured to perform specific functions, and may include sound cards, video cards, network cards, hard drives or other memory storage. The backplane has connectors for accepting mating connectors on the logic cards. The logic cage 201 and associated logic cards form one of the basic components of the gaming machine 100 and is securely housed within the cabinet of the gaming machine 100.

Central to the logic cage 201 is a processor 202 which may be a central processing unit, a microcontroller-based platform, a suitable integrated circuit, or one or more application-specific integrated circuits (ASIC's).

In this particular example, the processor 202 is in communication with or operable to access or to exchange signals with: memory 204, an audio control component 209, a hard meter interface 206, a random number generator 210, a user input component 216, a video display component 212, a credit input component 220 and a payout component 224.

Instructions and data to control operation of the processor 202 are stored in a memory 204 which is in data communication with processor 202. Memory 204 typically comprises both volatile and non-volatile memory and more than one of each type of memory. For example, the memory 204 may comprise RAM, ROM, and non-volatile memory in the form of a memory card, such as compact flash. RAM may include non-volatile RAM (NVRAM), magnetic RAM (MRAM), ferroelectric RAM (FeRAM), and other forms as commonly understood in the gaming industry. Memory 204 comprises a game software module 231 storing executable code, which when executed by the processor 202, provides the game on the gaming machine 100.

In particular, processor 202 runs executable code residing in game software module 231 of memory 204 that facilitates play of a game by a player through display unit 104 and/or push buttons 106 and touch sensors 108 mounted in the screen of display unit 104. Game software module 231 contains executable program code that defines the rules of the game, defines the sequence of gameplay, communicates with external systems, monitors peripheral equipment, and maintains integrity of the software code, among other things.

Audio control component 209 is in communication with audio output 208. Audio control component 209 may have its own digital signal processor, analogue to digital converters, amplifiers and other circuitry necessary to broadcast the output from the speakers.

Hard meter interface 206 communicates with hard meters 207. Hard meters 207 contain the gaming machine parameters which are required to be stored on a hard meter for regulatory reasons, which may include values such as total credit in and total credit out in some jurisdictions, for example. The values in hard meters 207 are only ever incremented, and cannot be reset or decremented.

Random number generator 210 generates random or pseudo-random numbers for the purpose of determining the outcome of chance-based games played on gaming machine 100. In some embodiments, random number generator 210 may be implemented in software as part of game software module 231. In some other embodiments, random number generator 210 may be implemented in firmware or in hardware. In some embodiments, the form that random number generator 231 takes may be dictated by gaming regulations.

User input component 216 communicates with user inputs 218, which may include pushbuttons 106 and touch screen sensors 108, among other inputs. Received inputs are decoded by user input component 216 and communicated to processor 202.

Video display component 212 communicates with video display unit 104. Processor 202 sends instructions to video display component 212, in order to cause images that make up the game sequence to be displayed on video display unit 104. These images may be pre-generated images retrieved by processor 202 from memory 204, or the images may be generated in real-time by processor 202 executing code modules stored in memory 204, as described below with reference to FIG. 4. In some embodiments, the displayed images may be made up of a pre-generated background retrieved from memory 204 in combination with an animated sequence generated in real-time by processor 202.

Credit input component 220 receives signals from credit input mechanism 221, which may include bill collector 114 in some embodiments. Credit input component 220 may use the signals to determine whether or not a player has provided sufficient credit to commence or continue gameplay, for example.

Payout component 224 communicates with payout mechanism 225, which may include coin tray 116. Payout component 224 may send instructions to payout mechanism 225, to cause payout mechanism 225 to dispense payment to a player. The payout may be in the form of cash, tokens or tickets in some embodiments. In some embodiments, the player may receive a code which they can use to collect their payout from a designated kiosk. In some embodiments, a player card or account may be credited with the payout amount. In some embodiments, a player may be able to finish game play and request a payout at various stages throughout the game. In some embodiments, players may be able to request a payout at any stage of the game. The player may be able to use user input 118 to request the payout.

In some embodiments, a player may insert an identification card or ticket into a card reader (not shown) of the gaming machine 100, in order to load information onto gaming machine 100. For example, the identification card or ticket may be associated with a player account containing credit, player settings, and player progress in a game. Such an identification card may be a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a mobile phone, a radio frequency identification tag, or any other suitable wireless device, that communicates a player's identification, credit totals (or related data), and other relevant information to the gaming device.

One or more of the method steps described in this disclosure may be implemented by game software module 231 stored in memory 204. Instructions stored in game software module 231 may be executed by processor 202 or any other processor. Further, the processor 202, the memory 204, the game software module 231 stored therein, or a combination thereof, may serve as a means for performing one or more of the method steps described herein.

Figure 3:
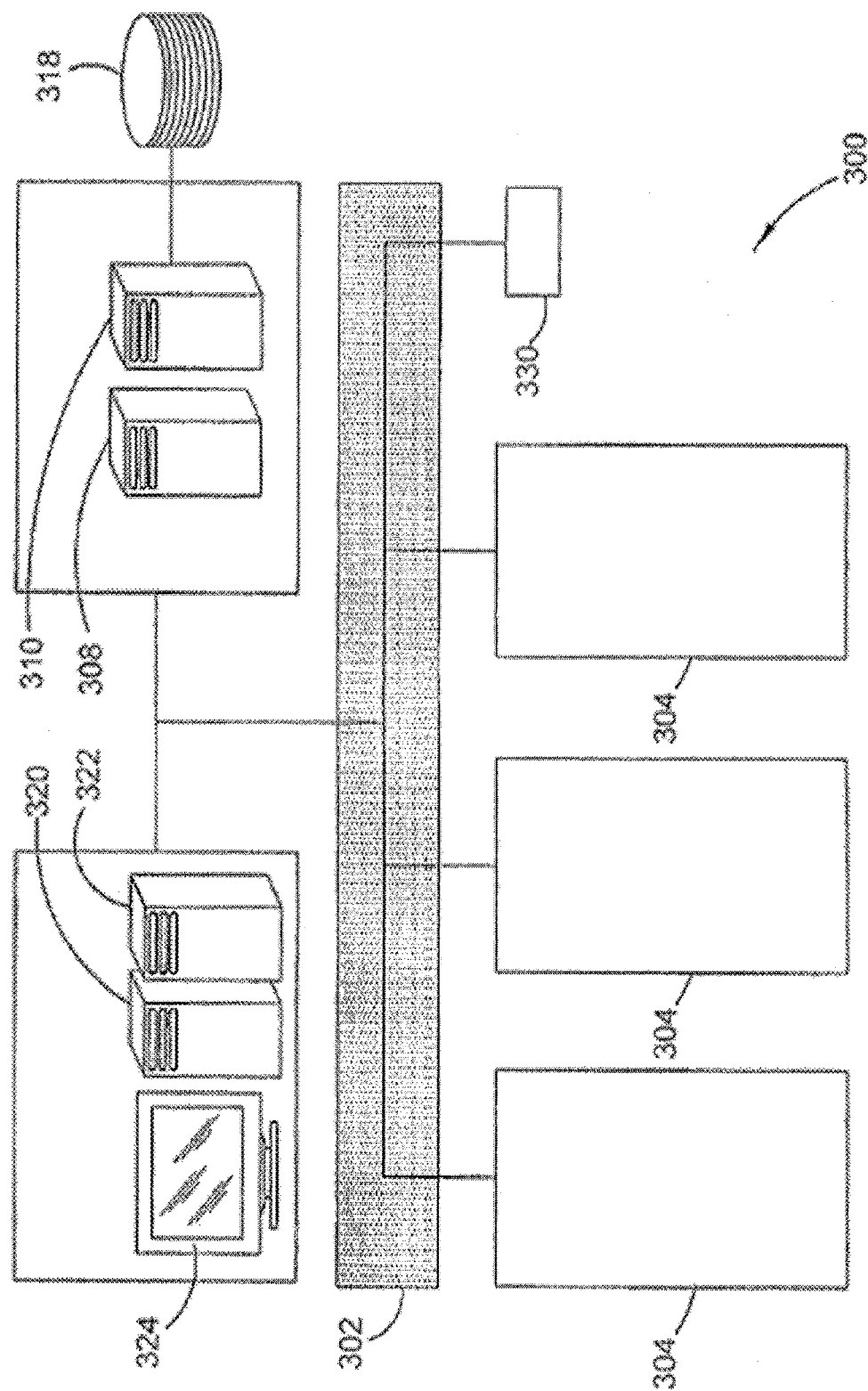
FIG. 3 is a schematic diagram of a gaming system in accordance with some embodiments, with the gaming system implemented over a network.

FIG. 3 shows a gaming system 300 in accordance with an alternative embodiment. The gaming system 300 includes a network 302, which for example may be or include an Ethernet, powerline, multimedia over Coax (MoCA), WiFi, or other type of network. The network 302 may also comprise a wide area network ("WAN"), the plain-old-telephone-system ("POTS), a local area network ("LAN"), a wireless LAN, the Internet, or any combination of these and other types of networks. Gaming machines 304 are connected to the network 302. The gaming machines 304 provide a player operable interface and may be the same as the gaming machines 100 shown in FIG. 2 or may have simplified functionality depending on the requirements for implementing game play.

Gaming machines 304 may include game logic circuitry 200 as described above with reference to FIG. 1. Gaming machines 304 may further include a console similar to console 102 which contains all or most components required to implement a game play whereby, at least during part of the game play, a player wins or loses a wager. Access to the components may be by way of a hinged door, which may be similar to hinged door 105. Mounted to the exterior of the console may be a display means in the form of at least one visual display unit, which may be similar to display unit 104, on which one or more games is played. The display unit may be implemented as a liquid crystal display, a plasma screen, or other high quality digital video display. There may be more than one visual display unit on each gaming machine 304. For example, in some embodiments, gaming machines 304 may have one visual display unit for displaying the game being played, and an additional visual display unit in the form of artwork similar to artwork 120 (described below) for displaying advertising or other material. In some embodiments, the additional visual display unit may be a video display unit. What is displayed on the visual display unit will depend on what the intended goal of the unit is in relation to the player and any other potential participants in the gaming system. In some embodiments, a plurality of gaming machines 304 may communicate with a central display screen (not shown), which may allow for portions of gameplay to be displayed to a wider audience in a gaming venue.

Gaming machines 304 may include a tactile input for a player to interact via touch with the gaming machines 304. The tactile input may be in the form of a combination of pushbuttons and a touch screen similar to push-buttons 106 and a touch screen 108, for enabling a player to play one or more games. The touch screen may be an electronic visual display that can detect the presence and location of a touch within the display area. The touch screen may be used during game setup, user browsing, or during the game play between start of a game and the end of a game, for example. Certain functions of the push-button may include: initiation of game play, credit output, gameplay selection, completion of gameplay etc. A midtrim of the machine 304, similar to midtrim 112, may house the push-buttons.

The tactile input may optionally or further include a joystick comprising a stick that pivots on a base and reports its angle or direction to the device it is controlling. The tactile input may optionally or further include a trackpad/touchpad being a pointing device featuring a tactile sensor to translate the motion and position of a user's fingers to a relative position on screen. In some embodiments, tactile input may further include a keyboard, electronic mouse, or other input mechanism. In some embodiments, the user interface may be a user configurable interface having multiple user input options.

The midtrim of gaming machine 304 may house a credit input mechanism including a bill collector, similar to credit input mechanism 221 and bill collector 114. The credit input mechanism may alternatively or additionally include a coin input chute, a card and/or ticket reader, a magnetic reading head for reading a magnetic stripe card, an electronic reader for a proximity card, a near field communications reader or any other form of electronic, wireless or contact that can input credit to the gaming machine.

A payout mechanism including a coin tray, similar to payout mechanism 225 and coin tray 116, may be mounted beneath the console and may be provided for cash or other payouts from the machine 1304 to the player. A hopper device may be provided which dispenses coins, or tokens equal to the amount of credit currently on the machine, into the coin tray. Aside from the coin tray, the payout mechanism may alternatively or additionally include a ticket dispenser for issuing a ticket dispensed by a printer which the user can redeem for cash, a note dispenser, a near field communications transmitter or means to enable remote credit transfer. Other suitable payout mechanisms, such as fund transfers to the player's electronically recordable identification card or smart card, may be implemented in accordance with described embodiments.

The gaming machine 304 may include a top box similar to top box 118 on which artwork similar to artwork 120 or other images may be carried in the form of electronic visual display units. The artwork could also comprise physical materials such as paper, plastic banners or posters. The artwork may have generic information related to the machine or gaming system or the artwork may be specifically made for a particular game to be played on the machine 304. While the artwork is shown as being carried on the top box, the art work can also be positioned in or on the bottom panel of the door, or any other part of the gaming machine 304 visible to the player. In some embodiments, the artwork may be a second digital display, which may show jackpot information, for example, or other supplemental video.

The gaming machines 304 further include an auditory unit in the form of auditory output 208 (see FIG. 1) to provide auditory feedback to the player of the gaming machine 304.

In a thick client embodiment, game server 308 implements part of the game played by a player using a gaming machine 304 and the gaming machine 304 implements part of the game. With this embodiment, as both the game server 308 and the gaming machine 100 implement part of the game, they collectively provide a game controller having similar functions to controller 201. A database management server 310 may manage storage of game programs and associated data for downloading or access by the gaming devices 304 in a database 318.

In a thin client embodiment, game server 308 implements most or all of the game played by a player using a gaming machine 304 and the gaming machine 304 essentially provides only the player interface. With this embodiment, the game server 308 provides the game controller. The gaming machine 304 will receive player instructions, pass these to the game server 305 which will process them and return game play outcomes to the gaming machine 304 for display. In a thin client embodiment, the gaming machines could be computer terminals, e.g. PCs running software that provides a player interface operable using standard computer input and output components.

Additional servers may be provided to assist in the administration of the gaming network 300, including for example a gaming floor management server 320, and a licensing server 322 to monitor the use of licenses relating to particular games. An administrator terminal 324 is provided to allow an administrator to run the network 302 and the devices connected to the network.

The gaming system 300 may communicate with other gaming systems, other local networks, for example a corporate network, and/or a wide area network such as the Internet, for example through a firewall 330.

In some embodiments, functionality at the server side of the network may be distributed over a plurality of different physical computers. For example, functional software elements may be run as a single "engine" on one server or a separate server may be provided. For example, the game server 308 could run a random number generator engine. Alternatively, a separate random number generator server could be provided. Further, in some embodiments a plurality of game servers could be provided to run different games or a single game server may run a plurality of different games as required by game machines 304.

Figure 4:
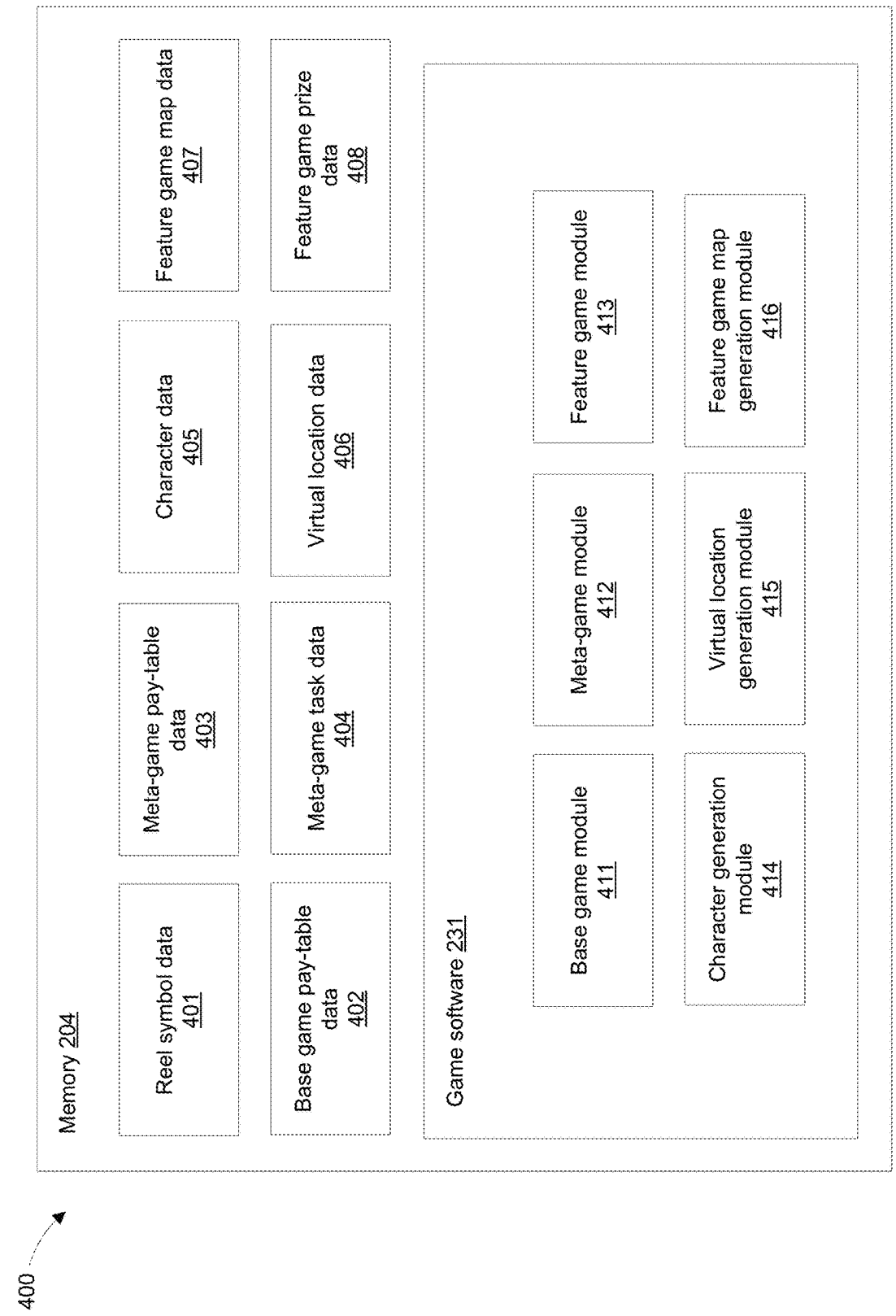
FIG. 4 is a schematic block diagram of the software components of a gaming system according to some embodiments.

A functional block diagram 400 illustrating software components of gaming machine 100 is shown in FIG. 4. Memory 204 stores game software module 231 which comprising a number of executable code modules. Memory 204 also stores various game data.

Game data stored by memory 204 includes symbol data 401, base game pay-table data 402, meta-game pay-table data 403, meta-game task data 404, character data 405, virtual location data 406, feature game map data 407, and feature game prize data 408. In some embodiments, memory 204 may further store information about one or more game themes or game scenarios, which may be selectable by a player of the game, or automatically selected prior to game commencement. A theme may include a number of conceptually linked game aspects that contribute to the overall appearance and/or style of the game, as well as the specific appearance of various aspects of the game, as described below. A scenario may be linked to a game theme, or vice versa, and may include details of the game style, game objectives, and storyline of the game.

Symbol data 401 may include data relating to the symbols to be displayed on visual display unit 104 of gaming machine 100 during the base game. For example, the particular images used for each symbol may be stored, as well as an identification code relating to the symbol, and a value of the symbol in the base game. The visual appearance of the symbols may be dependent on the theme of the game.

Base game pay-table data 402 may include data relating to the pay-table used in the base game played on gaming machine 100. Base game pay-table data 402 may be used to calculate an amount of points, credits or other awards to be won by a player of gaming machine 100 when playing the base game. Base game pay-table data 402 may be used to determine the amount won based on which combination of symbols appear on visual display unit 104. Base game pay-table data 402 may be related to symbol data 401, as the amount won by a player as determined by the value of the symbols as stored in symbol data 401.

Meta-game pay-table data 403 may include data relating to the pay-table used in the meta-game played on gaming machine 100. Pay-table data 403 may be used to calculate an amount of points, credits or other awards to be won by a player of gaming machine 100 when playing the meta-game. Pay-table data 403 may be used to determine the amount won based on which combination of symbols appear on visual display unit 104. Meta-game pay-table data 403 may be related to symbol data 401. In some embodiments, meta-game pay-table data 403 may also be related to base game pay-table data 402, so that outcomes of the meta-game may be related to outcomes of the base game.

Meta-game task data 404 may include data relating to tasks to be completed by the player during a meta-game played on gaming machine 100. For example, meta-game task data 404 may include information about how many tasks a player needs to complete before they receive an award or obtain a particular level. Task data 404 may further include information about the symbol outcomes that may cause a task to be determined to have been completed. In some embodiments, meta-game task data 404 may be related to meta-game pay-table data 403, in order to allow the completion tasks to be completed based on outcomes as determined from the meta-game pay-table data 403. Meta-game task data 404 may also be related to location data 406 and character data 405, as the specific tasks to be completed may depend on the location and character selected by the player. In some embodiments, meta-game task data 404 may relate to game theme or game scenario data as well as or instead of location data 406. The tasks may also be dependent on the current theme of the game. The theme of the game may change over the course of playing the game. For example, once a player has completed one or more meta-game objectives and the feature game in a particular map location (having a particular associated theme), the player may elect to move to another map location that has a different associated theme. In some alternative embodiments, the theme and/or scenario of the game may be selectable by a player independent of or instead of the location.

Character data 405 may include data relating to a character selected by a player for playing a game on gaming machine 100. Character data 405 may include information about available characters including a character name, the appearance of the character, and initial skill levels of the character. In some embodiments, character data 405 may include data relating to the character selected by the player, and any modified attributes of the character, such as an increased level or increased skill set achieved through game play. The characters available in a particular game may be dependent on the theme of the game. In some embodiments, the character may be an avatar or player persona with graphical representation. The avatar or player persona may be a human, animal, fictional being, vehicle, object, or other type of graphical representation in some embodiments.

Virtual location data 406 may include data relating to a virtual location selected by a player for playing a game on gaming machine 100. Virtual location data 406 may include information about available locations including a location name, one or more images of the location, and characteristics about the location. Virtual location data 406 may be related to character data 405, as the available characters may depend on the chosen location or vice versa. Virtual location data 406 may also be related to the meta-game task data 404, as the tasks presented during the meta-game may depend on the location selected. Virtual location data 406 may further be related to the symbol data 401, as the symbols presented during the base game may depend on the location selected. The current theme of a particular game may be dependent on the current selected virtual location of the game. Alternatively, locations available in a particular game may be dependent on the theme of the game. In some embodiments, the virtual location may change based on a scenario selected by the player. In some embodiments, the same virtual location may be used in all or some of a number of game scenarios.

Feature game map data 407 may include data relating to a map of a game play location for a feature game played on gaming machine 100. Feature game map data 407 may include information about the layout of a feature game location, including where game objects may be located within the virtual location. Feature game map data 407 may be related to virtual location data 406, as the feature game theme may be determined based on the virtual location selected or vice versa. Feature game map data 407 may further be related to character data 405, as the feature game location may be determined based on the character selected, and the level of the character. Feature game map data 407 may also be dependent on the current theme of the game.

Feature game prize data 408 may include data relating to an amount of points, credits or other awards to be won by a player of gaming machine 100 when playing the feature game. Feature game prize data 408 may include information about how many awards are to be included in the feature game, and where they should be located. Feature game prize data 408 may be related to feature game map data 407, in order to allow for the awards to be placed at various locations within the feature game location as defined by feature game map data 407.

In some embodiments, the game machine 100/304 may have an overall theme for all of the game play, plus a number of sub-themes for different parts or stages of base game play and/or meta-game play and/or feature game play.

In some embodiments, code modules within game software module 231 may include base game module 411, meta-game module 412, feature game module 413, character generation module 414, virtual location generation module 415, feature game map generation module 416, and other code modules.

Base game module 411 may be executable by processor 202 to cause a base game, which may be a reel-type game in some embodiments, to be displayed on visual display unit 104. The base game may be any chance-based game, in which a symbol sub-set, such as a two-dimensional array of symbols, is randomly selected from a larger symbol set for display on visual display unit 104, with or without the appearance of spinning reels. The symbol set from which the displayed symbol subset is randomly selected for the base game is sized to permit a reasonable degree of variation among the selected symbols across a significant number of instances of symbol sub-set generation. The symbol sub-set may include multiple instances of the same symbol.

Base game module 411 may be executed when a player initiates game play using user input 218. Base game module 411 may allow a player to make a bet or wager using credit input mechanism 221, input mechanisms 106, and user input 218, and may determine a random game outcome using random number generator 210. Executing base game module 411 may cause processor 202 to determine whether the player won any credits or other awards using base-game pay-table data 402. Processor 202 may then cause gaming machine 100 to credit the player with any winnings using payout mechanism 225.

Meta-game module 412 may be executable by processor 202 to cause a meta-game to be shown on visual display unit 104. In some embodiments, the meta-game may include a reel-based game, and may use the same reels as those used for the base game. The meta-game may be any chance-based game, in which a symbol sub-set, such as a two-dimensional array of symbols, is randomly selected from a larger symbol set for display on visual display unit 104 with or without the appearance of spinning reels. The symbol set from which the displayed symbol subset is randomly selected for the meta-game is sized to permit a reasonable degree of variation among the selected symbols across a significant number of instances of symbol sub-set generation. The symbol sub-set may include multiple instances of the same symbol.

In some embodiments, meta-game module 412 may be executed when a player initiates game play using user input 218. Meta-game module 412 may include a series of tasks which must be completed. In some embodiments, the completion of the tasks is dependent on the appearance of certain symbols or combinations of symbols in a randomly generated symbol sub-set in the base game. For example, a particular symbol or combination of symbols appearing as part of the base game may contribute to the completion of a task. The base game and meta-game may therefore rely on the same randomly generated symbol sub-set, although a winning symbol combination in the base game may not also be a winning symbol combination in the meta-game. In other words, the same symbol subset upon which the outcomes of the base game and meta-game are based can lead to different results in each of the base game and meta-game. For example, a winning result in the base game may not correspond with a winning result in the meta-game and vice versa. Additionally, while a winning result in the base game provides monetary reward, a winning result in the meta-game provides non-monetary reward, such as advancement of the player's character toward a character achievement milestone, such as a level increase or a skill or attribute increase. The non-monetary rewards earned in the meta-game can lead to a greater prospect of earning monetary rewards in the skill-based feature game, as described below.

The rules basis and paradigm for determining a winning outcome in the meta-game may be different from the rules and paradigm to determine a winning outcome in the base game. For example, a winning outcome in the meta-game may be due to the appearance of only one symbol among the randomly generated symbol subset, without necessarily relying on a combination of symbols being present in the symbol subset. Further a winning outcome in the meta-game may be due to the appearance of a symbol combination among the randomly generated symbol subset that does not align with a particular play line (i.e. predetermined linear sequence of symbols), whereas the base game may rely on a combination of symbols being present in the symbol subset along a predetermined play line in order to be determined to be a winning outcome. Executing meta-game module 412 may cause processor 202 to determine whether the player completed a meta-game task using meta-game pay-table data 403.

Feature game module 413 may be executable by processor 202 to cause a feature game to be shown on visual display unit 104. In some embodiments, the feature game may be a dungeon crawl or treasure hunt type game, where a player must navigate through a virtual location and interact with virtual objects to win credits or other awards. In some embodiments, feature game module 413 may cause a virtual location to be shown on visual display unit 104 based on feature game map data 407. Prizes may be distributed throughout the virtual location based on feature game prize data 408. In some embodiments, the prizes may be hidden in virtual chests, boxes or other objects that the player must open or otherwise interact with in order to retrieve the prizes. In some embodiments, only some of the virtual chests, boxes or other objects will contain prizes. In some embodiments, a player may need to solve puzzles, battle villains, or complete other tasks in order to obtain prizes. In some embodiments, the prizes may include either or both monetary and non-monetary prizes.

Character generation module 414 may be executable by processor 202 to cause one or more characters to be generated and displayed on gaming machine 100 for selection and/or modification by a player. In some embodiments, character generation may include a player being able to generate a unique character based on a number of configurable character attributes, such as character type (e.g. warrior, wizard, troll, elf etc.) body shape, skin tone, hair colour, sex and clothing. In some alternative embodiments, pre-generated characters may be retrieved from character data 405 and displayed for a player to select. Selected character data may be stored in character data 405.

Virtual location generation module 415 may be executed by processor 202 to cause one or more virtual locations to be generated and displayed on gaming machine 100 for selection by a player. In some embodiments, the one or more virtual locations may be displayed on a map. The virtual locations may be generated based on virtual location data 406.

Feature game map generation module 416 may be executed by processor 202 to cause virtual location images to be generated and displayed on gaming machine 100 for playing the feature game. The feature game map may be generated based on feature game map data 407.

Figure 5:
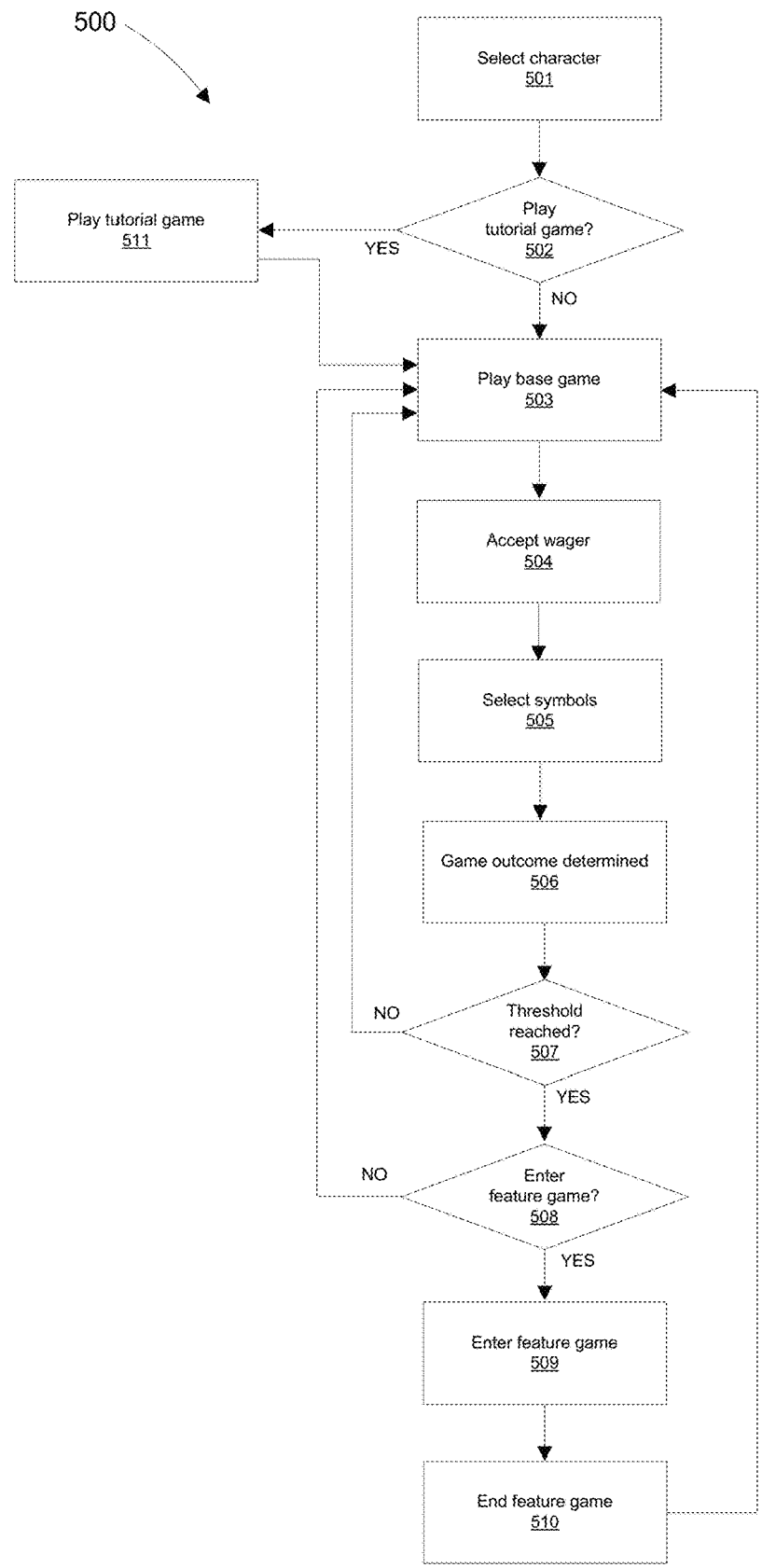
FIG. 5 is a flow diagram illustrating a method of controlling game play on a gaming machine according to some embodiments.

Referring now to FIG. 5, there is shown a flow diagram illustrating a method 500 of gaming by implementing a game at a gaming system, such as gaming machine 100 illustrated in FIG. 2 and gaming machines 304 illustrated in FIG. 3.

The method 500 of gaming may comprise an initial step 501 of a player providing credit at credit input mechanism 221 of the gaming machine 100, and selecting a character for game play. In some embodiments, this may also include entering a name to be associated with the character. Processor 202 may execute character generation module 414, which may read from character data 405. The character may be selected by scrolling through a series of available characters on the touchscreen display of gaming machine 100. In some embodiments, the character may be created by the player by choosing from a number of different options for character components. For example, the player may be able to generate a character by selecting from various body shapes, facial features, hairstyles, and clothing for the character to have. The character created by the player may be stored in character data 405.

In some embodiments, the player may be able to select a previously created character that has been stored by the system in character data 405. In some embodiments, the player may be able to scan a ticket that stores data related to a previously created character. Gaming machine 100 may be configured to access data from a stored player account or player profile based on the data read from the ticket. Processor 202 may retrieve the player account information based on a database lookup using the data read from the ticket.

In some embodiments, each selectable character may have a number of predetermined base attribute ratings stored in character data 405. For example, characters may have attributes such as strength, agility and speed. In some embodiments, different or additional attributes may exist. For example, in some embodiments, characters may have attributes such as wisdom, dexterity, and/or endurance. These attributes may be measured on a scale of 1 to 10, for example. Each character may have a base rating for each attribute. A particular character may have a strength rating of 6, an agility rating of 3 and a speed rating of 4, for example. In some alternative embodiments, the attributes may be measured based on a different numerical scale (1 to 5, 1 to 20, or 1 to 100, for example), or on a non-numerical scale, which might be a graphical representation of the attribute on a bar, a number of stars, or some other scale. The character may also have a predetermined base level. In some embodiments, all characters start at base level 1.

In some embodiments, the selected character may be able to be changed during gameplay using user input 218. If a character is changed, they may retain some or all of the levels and skills of the previously selected character.

In some embodiments, the player may also be able to select a virtual game play location from a map. Processor 202 may execute virtual location generation module 415, which may read from virtual location data 405 to display images of a map showing a number of selectable locations on visual display unit 104. For example, the selectable locations may include a forest, desert, castle, and/or swamp in some embodiments. Virtual game play locations may be tailored to a general theme of the game. In some embodiments, the selection of the character may determine the virtual game play starting location. For example, selecting a knight character may result in game play beginning in a virtual castle, while selecting an elf may result in game play in a virtual forest, and selecting a troll may result in game play beginning in a virtual swamp.

After a character selection has been made, in some embodiments a tutorial game may be presented to the player at step 502, based on predetermined selection criteria. In some embodiments, the tutorial game may be a simulation of the feature game, or an aspect of the feature game. In some embodiments, the tutorial game may not allow the player to win any monetary rewards. In some embodiments, entry into the tutorial game may be determined based upon whether or not the player is a new player or an experienced player, the level of the player's character, how long it has been since the player played the game last, or other criteria. In some embodiments, entry into the tutorial game may be at the election of the player. If the criteria for entering the tutorial game is met, the method moves to step 510, and a tutorial game is presented to the player.

The tutorial game may help a player become familiar with the controls used and gameplay style of the feature game, as described below. In some embodiments, the tutorial game may teach a player new tricks, skills or combinations that they can apply during the feature game. Once the tutorial game is over, the method moves to step 503. If the criteria is not met, a tutorial game is not played, and the method moves to step 503.

According to some embodiments, the tutorial game may be presented to the player at various stages of game play, and not only at the start of gameplay. For example, in some embodiments the tutorial game may be presented to the player when their character or avatar achieves a new level, learns a new skill or receives a new weapon.

At step 503, a base game is implemented on gaming machine 100 by processor 202 executing base game module 411. In some embodiments, the base game may be a reel game, which may be generated using symbol data 401. In some embodiments, the base game may be a different chance based game in which symbols are randomly selected from a symbol set for display on visual display unit 104, without the appearance of spinning reels.

At step 504, a player causes an instance of base game module 411 to be initiated by processor 202, through interaction with user input 118. The amount bet by the player may be split up into two prize pools, being a base game prize pool, and a feature game prize pool. Some of the wager may also be kept by the house, being the business or establishment that owns and/or controls gaming machines 100/304. The amount kept by the house may be varied based on the regulatory rules in the jurisdiction the game is being played in.

As the base game is initiated, processor 202 may also initiate meta-game module 412 based on meta-game task data 404. The meta-game may comprise a series of tasks to be completed by the player. Progress and completion of the tasks may be determined based on outcomes of the base game as determined with reference to meta-game pay-table data 403.

At step 505, base game module 411 is executed by processor 202 to cause a plurality of symbols derived from symbol data 401 to be selected by processor 202 for display at a plurality of display positions on a visual display unit 104. In some embodiments, where the base game is a reel game, base game module 411 may be executed by processor 202 to cause the reels to appear to virtually spin on visual display unit 104. The selection of the symbols may be performed randomly, for example by the random number generator 414.

In a further step 506, a game outcome is determined based on the randomly displayed symbols on the display. The game outcome may consist of a base game outcome, determined by processor 202 based on base game pay-table data 402, and a meta-game outcome determined by processor 202 based on meta-game pay-table data 403. The base game outcome may result in the awarding of a monetary prize to the player, based on the particular symbols displayed. If a base game outcome results in the winning of a monetary reward, this may be credited to the player immediately in some embodiments through payout mechanism 225. In some other embodiments, the amount won may be stored and accumulated during the game session, and the total amount may be awarded at the end of the game session. The amount won may be taken out of the base game prize pool. The amount won may be awarded as cash, or as credits that can be redeemed for cash.

The meta-game outcome may allow the player to progress towards and/or complete one or more tasks or quests set in the meta-game, as determined by meta-game module 412 based on meta-game task data 404. The progress made toward the completion of each task may be displayed to the player in the form of a fraction, percentage, progress bar, or other means of showing the advancement through the task. If the meta-game outcome results in the completion of all of the set tasks, the player level as stored in character data 405 may be increased. In some embodiments, some or all of the player attributes stored in character data 405 may also be increased.

In some embodiments, the meta-game outcome may alternatively or in addition allow a player to achieve other rewards. This may be on the completion of all tasks within a quest, each time a task is completed, or simply based on the combination of symbols displayed during the game. In some embodiments, the meta-game outcome may allow a player to win a reward, such as an aesthetic reward or skill-based reward, that they can apply to their character. In some embodiments, the player may be able to win one or more units of an in-game virtual currency, which the player may later be able to use to purchase an aesthetic or skill based reward. For example, a game may allow a player to win in-game credits, coins, jewels, tokens, or another form of virtual currency. According to some embodiments, more than one different form of virtual currency may be awarded during the meta-game, and the different forms of currency may be used to purchase different types of items. Different aesthetic and skill based rewards may be able to be virtually purchased with the virtual currency, and may each cost a different amount. For example, a cloak may cost 3 coins, a healing potion might cost 5 coins, and a pair of boots that increases player speed may cost 10 coins, in some embodiments.

At step 507, processor 202 may determine whether a threshold has been reached that allows for entry into a feature game. In some embodiments, the entry to the feature game may be by a predetermined symbol combination appearing on the reels. In some alternative embodiments, entry to the feature game may be based on reaching a time-based threshold (that the player has been playing the game for at least 5 minutes, 10 minutes, 15 minutes, 20 minutes, 25 minutes or 30 minutes, for example), a spend based threshold (that the player has spent a particular amount of money) or a games played threshold (that the player has played a particular number of base games). Multiple different threshold conditions may be applied in combination. In some embodiments, entry to a feature game may be semi-randomised after the threshold condition has been met, for example where the entry is selected at random from a range in addition to or on top of the threshold. For example, for a given base spend threshold, such as 100 credits, entry into the feature game may occur at a randomly selected time between 5 minutes and 10 minutes after reaching the base spend threshold.

If the threshold has not been reached, game play returns to step 503, with processor 202 causing base game module 411 to re-initiate and the player having a further opportunity to place a wager and play the base game.

If the threshold has been reached, at step 508 the player is given the opportunity to enter the feature game. If the player chooses not to enter the feature game, which may be to allow themselves time to meet more meta-game objectives, for example, the play returns to step 503, with processor 202 causing base game module 411 to re-initiate and the player having a further opportunity to place a wager and play the base game. In some embodiments, the player may be forced to enter the feature game after a predetermined limit has been reached. For example, the player may be forced to enter the feature game after a predetermined amount of time, after a predetermined number of base games have been played, once the player's character reaches a predetermined level, or after the player has spent a predetermined amount of money or credits, for example If the player chooses to enter the feature game, the feature game is initiated at step 509 by processor 202 executing feature game module 413. The feature game may be a skill-based adventure game in some embodiments. In some alternative embodiments, the skill-based feature game may include an additional chance-based game.

Player attributes stored in character data 405 may contribute to the likelihood of success in the feature game, whether it be skill or chance based. For example, a character with higher strength rating may be more likely to succeed in certain actions in the feature game than a character with a lower strength rating (for example, breaking open a treasure chest).

The feature game may allow the player to win both monetary and non-monetary prizes. The monetary prizes may be paid out of the feature game pool. Non-monetary prizes may include improvements to the visual appearance of the character, such as new hairstyles, clothing and accessories. In some embodiments, the non-monetary prizes may also include direct or indirect improvements to the character's attribute ratings. For example, a non-monetary prize may be that the player's character's strength is increased by 10%. An example of an in-direct improvement may be that the character receives boots that improve their speed, or gloves that improve their dexterity. The prizes available in any feature game may be determined by processor 202 based on feature game prize data 408.

According to some embodiments, the feature game may include a "treasure hunt" type game, in which a player must navigate through a virtual environment and interact with virtual objects to gain rewards. For example, in some embodiments the player may navigate through a dungeon-type environment, and open chests to gain rewards. Each chest may be predetermined to contain a monetary or non-monetary reward, or to be empty, for example. The player may navigate through the virtual environment using user input 218.

In some embodiments, the feature game may include an arena style battle game, a racing game, a first person shooter, or another type of game that allows a player to control one or more virtual objects or characters through one or more virtual scenarios.

The theme of the virtual environment navigable during the feature game may depend on the virtual game play location selected at step 503, the game scenario, and/or character level. For example, if the player selected a knight character, the game play may take place in a castle. A level 1 knight may need to navigate through the dungeons of the castle, for example, while a level 2 knight may navigate through the servant's quarters. A higher level knight, such as a level 8 knight, may need to navigate through the king's chamber. As the character progresses through the levels, the game play location may be altered appropriately. In some embodiments, the player may be able to select a particular virtual location for the feature game. The virtual environment may be pre-generated and stored in feature game map data 407.

The feature game may run until a predetermined threshold is reached at step 510. This may be a time-based threshold, or an achievement based threshold, for example. Once this is reached, the game will be directed back to the base game at step 503 by processor 202 re-initiating base game module 411.

In some embodiments, the player may be able to end the game session at any point during gameplay. When the player ends the game session, any accumulated winnings may be paid out to the player, in the form of cash or credits using payout mechanism 225. In some embodiments, gaming machine 100 may also issue a ticket corresponding to the player's character in the game. The ticket may allow a player to load their character into the game at their next gaming session, as described above with reference to step 501. In some embodiments, the player may be able to use the ticket to upload their character into an online gaming environment. In some embodiments, only character aesthetics, and not attributes earned through playing the base game, may be able to be transferred. In some alternative embodiments, character ability ratings, in addition to or instead of character aesthetics, may be able to be transferred via the ticket.

In some embodiments, instead of a ticket, character data may be stored in another form, such as using a QR code, smart card, magnetic stripe card, near field transfer, or another electronic or non-electronic means of data storage, that the player can use to store their character data to load their character into the game at their next gaming session.

Figure 14:
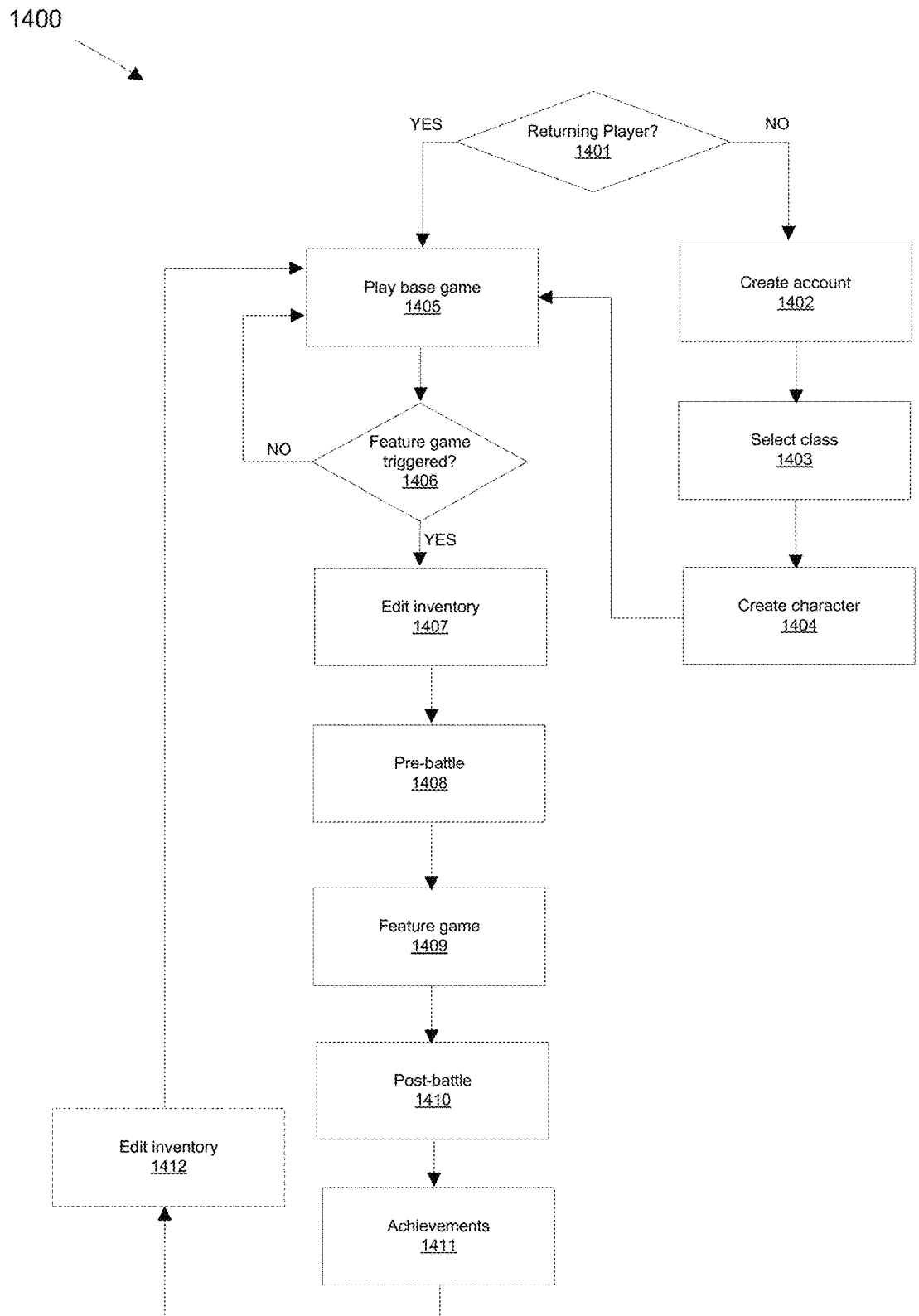
FIG. 14 is a flow diagram illustrating an alternative method of controlling game play on a gaming machine according to some embodiments.

FIG. 14 illustrates an alternative method 1400 of gaming by implementing a game at a gaming system, such as gaming machine 100 illustrated in FIG. 2 and gaming machines 304 illustrated in FIG. 3.

The method 1400 of gaming may comprise an initial step 1401 of a player indicating whether the player is a returning player or a new player. If the player is a returning player, the player may be able to scan a ticket or provide account information that stores data related to the player's account, and the method may move to step 1405. If the player is a new player, at step 1402 the player may be prompted via video display 104 of gaming machine 100/300 to create a new account, which may require the player to use user input 218 to enter details such as an account name and password, for example. At step 1403, the player may be prompted via video display 104 of gaming machine 100/300 to select a player class. The class may be a character type, such as a warrior, hunter, rogue or mage, for example. As described below with reference to FIGS. 15 and 16, the class selection may have an effect on the look and feel of subsequent games played by the user.

At step 1404, the player may be prompted via video display 104 of gaming machine 100/300 to create a character. In some embodiments, this may also include entering a name to be associated with the character. Processor 202 may execute character generation module 414, which may read from character data 405. The character may be selected by scrolling through a series of available characters on the touchscreen display of gaming machine 100. In some embodiments, the character may be created by the player by choosing from a number of different options for character components. For example, the player may be able to generate a character by selecting from various body shapes, facial features, hairstyles, and clothing for the character to have. The character created by the player may be stored in character data 405.

According to some embodiments, steps 1403 and 1404 may be performed in a single step. For example, according to some embodiments, a character may be automatically selected based on a selection of a class. In some alternative embodiments, a player may select a character first, and a class may be automatically selected based on a class associated with the chosen character.

At step 1405, a base game is implemented on gaming machine 100 by processor 202 executing base game module 411. In some embodiments, the base game may be a reel game, which may be generated using symbol data 401. In some embodiments, the base game may be a different chance-based game in which symbols are randomly selected from a symbol set for display on visual display unit 104, without the appearance of spinning reels. The player may cause an instance of base game module 411 to be initiated by processor 202, through interaction with user input 118. Base game module 411 is executed by processor 202 to cause a plurality of symbols derived from symbol data 401 to be selected by processor 202 for display at a plurality of display positions on a visual display unit 104. In some embodiments, where the base game is a reel game, base game module 411 may be executed by processor 202 to cause the reels to appear to virtually spin on visual display unit 104. The selection of the symbols may be performed randomly, for example by the random number generator 414.

As described above with reference to FIG. 5, a game outcome is determined based on the randomly displayed symbols on the display. The game outcome may consist of a base game outcome, determined by processor 202 based on base game pay-table data 402, and a meta-game outcome determined by processor 202 based on meta-game pay-table data 403. The base game outcome may result in the awarding of a monetary prize to the player, based on the particular symbols displayed. If a base game outcome results in the winning of a monetary reward, this may be credited to the player immediately in some embodiments through payout mechanism 225. In some other embodiments, the amount won may be stored and accumulated during the game session, and the total amount may be awarded at the end of the game session. The amount won may be taken out of the base game prize pool. The amount won may be awarded as cash, or as credits that can be redeemed for cash.

The meta-game outcome may allow the player to progress towards and/or complete one or more tasks or quests set in the meta-game, as determined by meta-game module 412 based on meta-game task data 404. The progress made toward the completion of each task may be displayed to the player in the form of a fraction, percentage, progress bar, or other means of showing the advancement through the task. If the meta-game outcome results in the completion of all of the set tasks, the player level as stored in character data 405 may be increased. In some embodiments, some or all of the player attributes stored in character data 405 may also be increased.

In some embodiments, the meta-game outcome may alternatively or in addition allow a player to achieve other rewards. This may be on the completion of all tasks within a quest, each time a task is completed, or simply based on the combination of symbols displayed during the game. In some embodiments, the meta-game outcome may allow a player to win a reward, such as an aesthetic reward or skill-based reward, that the player can apply to their character. In some embodiments, the player may be able to win one or more units of an in-game virtual currency, which the player may later be able to use to purchase an aesthetic or skill based reward. For example, a game may allow a player to win in-game credits, coins, jewels, tokens, or another form of virtual currency. Different aesthetic and skill based rewards may be able to be virtually purchased, and may each cost a different amount. For example, a cloak may cost 3 coins, a healing potion might cost 5 coins, and a pair of boots that increases character or avatar speed may cost 10 coins, in some embodiments.

At step 1406, processor 202 determines whether a trigger event has occurred that allows for entry into a feature game. In some embodiments, the trigger for entry to the feature game may be by a predetermined symbol or symbol combination appearing on the game display, for example on the reels. In some alternative embodiments, entry to the feature game may be based on another trigger, as described above with respect to FIG. 5, such as reaching a time-based threshold, a spend-based threshold, or a games-played threshold.

Until the trigger event occurs, game play continues at step 1405, with processor 202 causing base game module 411 to continue play and the player having a further opportunity to place a wager and play the base game.

If the trigger event occurs, at step 1407, the player is given the opportunity to edit the player's inventory before entering the feature game, as described below in further detail with reference to FIG. 18. Once the inventory has been edited, video display 104 of gaming machine 100/300 may display a pre-battle screen at step 1408, which may allow a user to make any final character adjustments before entering the feature game, such as upgrading weapons or shields, using potions or other special items. According to some embodiments, some selections made on the pre-battle screen may be changed during the game. For example, a player may be able to select a different weapon to use mid-way through the feature game, in some embodiments.

When a player indicates using user input 218 that the player is satisfied with their pre-battle selections, the feature game is initiated at step 1409 by processor 202 executing feature game module 413. The feature game may be a skill-based adventure game in some embodiments. The feature game may be a battle, treasure hunt, first person shooter, quest, or other type of skill-based game, as described above with reference to FIG. 5.

The feature game may run until a predetermined threshold, trigger event or end event is reached. Once the feature game ends, at step 1410 video display 104 of gaming machine 100/300 may display a post-battle screen, which may present the player with the ability to use any virtual credits earned during the course of the feature game, for example.

After viewing the post-battle results, at step 1410 video display 104 of gaming machine 100/300 may display an achievements screen, which may display statistics about the game play during the feature game, achievements earned and prize money won. This is described in further detail below with reference to FIG. 20. After viewing achievements, the player may be given the opportunity to revisit the inventory screen again at step 1412 according to some embodiments. After display of the inventory screen, the sequence of gameplay reverts to step 1405 by presenting the player with the base game again.

A specific example of the methods 500 and 1400 of gaming are described below with reference to screenshots of the display of the gaming system 100 shown in FIGS. to 6 to 13 and 15 to 20.

Figure 6:
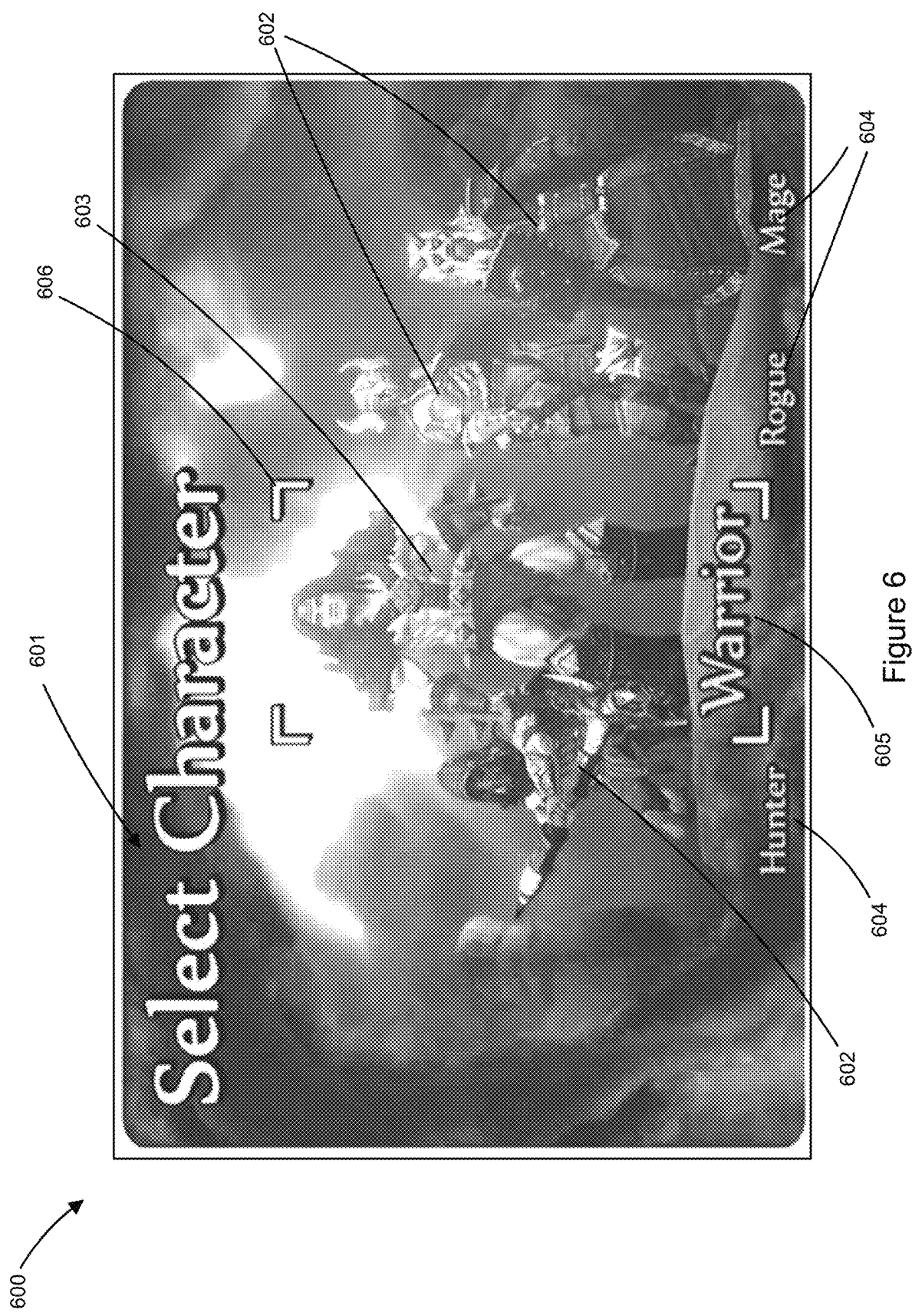
FIG. 6 is an example screenshot of a character selection screen.

FIG. 6 is an example screenshot of a character selection screen 600 of gaming machine 100, as generated by character generation module 414 based on information read by processor 202 from character data 405. Screen 600 shows a message 601 instructing a player of gaming machine 100 to select a character. A number of characters 602 may be displayed for selection. Each character has a character type descriptor 604 (such as warrior, hunter, rogue or mage, for example). The player may scroll through the characters using user input 218. As the player scrolls through the available characters 602, one character may appear as the "selected" character 603 at any given time. The selected character 603 is shown as being in front of unselected characters 602, and is shown highlighted by virtual markings 606. The name of the selected character 605 may appear bigger, in a different colour, or otherwise distinguishable from the names of the unselected characters 604. Once the player has scrolled to their desired character, they may use user input 218 to confirm their selection and exit the character selection page.

Figure 7:
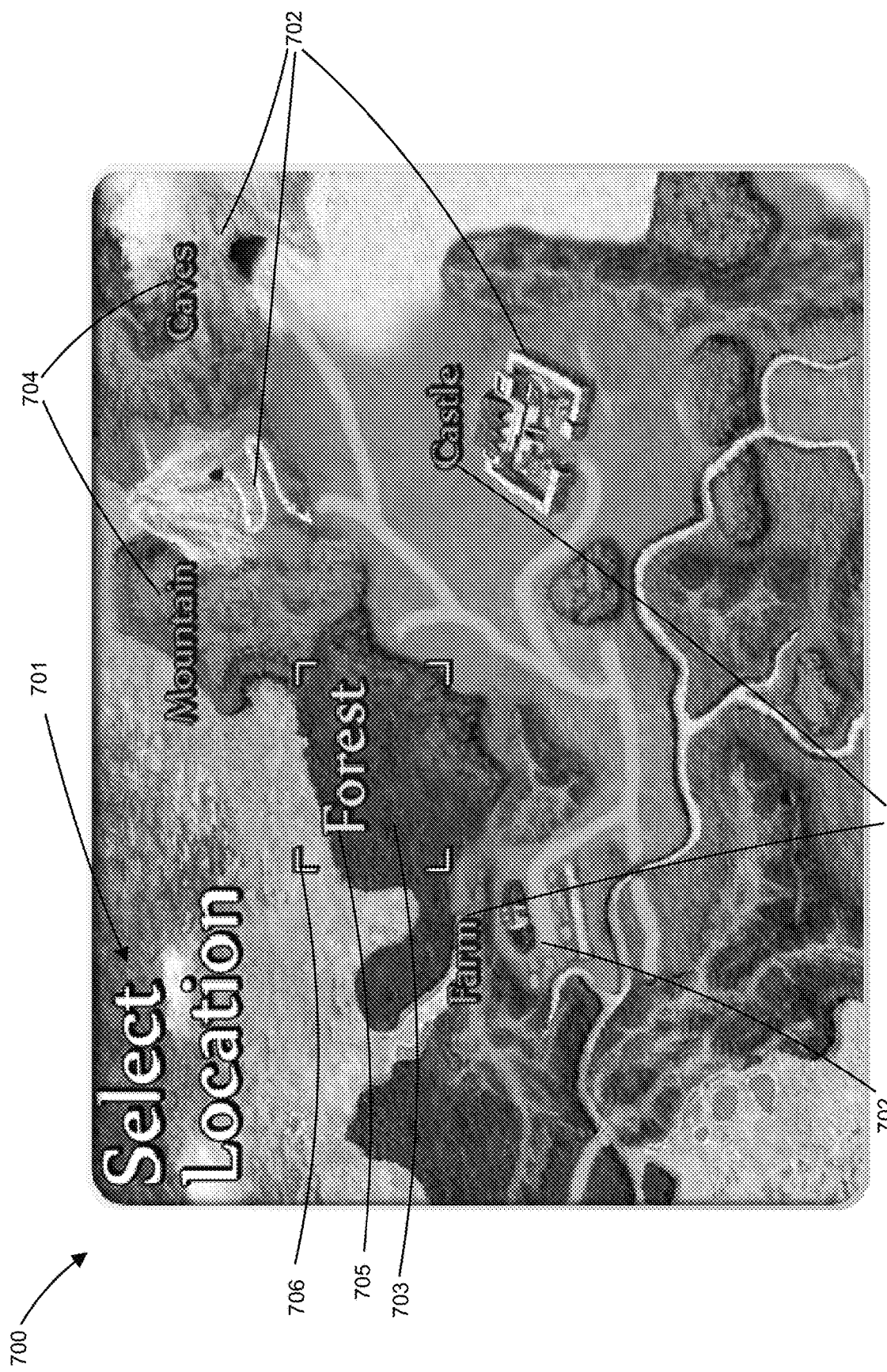
FIG. 7 is an example screenshot of a virtual location selection screen.

FIG. 7 is an example screenshot of a virtual location selection screen 700 of gaming machine 100, as generated by virtual location generation module 415 based on information read by processor 202 from virtual location data 406. Screen 700 displays a message 701 instructing a player of gaming machine 100 to select a location. A number of locations 702 are displayed for selection. Each location has a location name or descriptor 704. The player may be able to scroll through the locations using user input 218. As the player scrolls through the available locations 702, one location may appear as the "selected" location 703 at any given time. The selected location is shown highlighted by virtual markings 706. The name of the selected location 705 may appear bigger, in a different colour, or otherwise distinguishable from the names of the unselected locations 704. Once the player has scrolled to their desired location, they may use user input 218 to confirm their selection and exit the location selection page.

Figure 8:
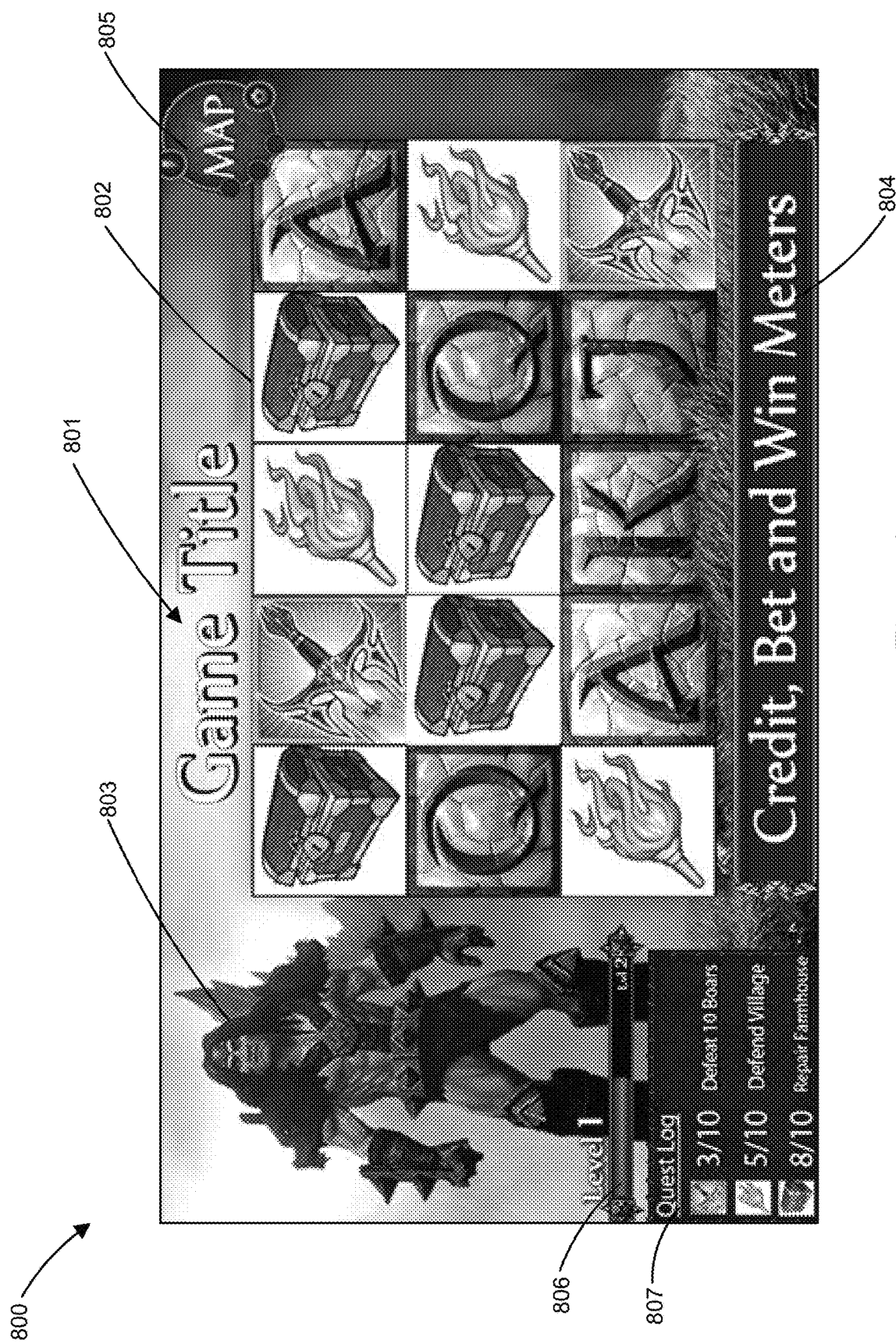
FIG. 8 is an example screenshot of a base game screen.

FIG. 8 is an example screenshot of a base game screen 800 of gaming machine 100, as generated by base game module 411 based on information read by processor 202 from symbol data 401. Screen 800 displays a game title 801 and symbol sets 802 for a base game. Symbol sets 802 are described in further detail below with reference to FIGS. 9 and 10. Screen 800 also displays a selected character 803, and credit, bet and win meters 804 which may display an amount of credit that a player has, an amount bet, and an amount won in a particular gaming session. Selected character 803 may be a character selected by the player using character selection screen 600. Screen 800 may have a map selection virtual button 805, which may be used to go back to virtual location selection screen 700. Screen 800 also shows level indicator 806 and quest log 807. Level indicator 806 and quest log 807 are described in further detail below with reference to FIGS. 11 to 12C.

Figure 15:
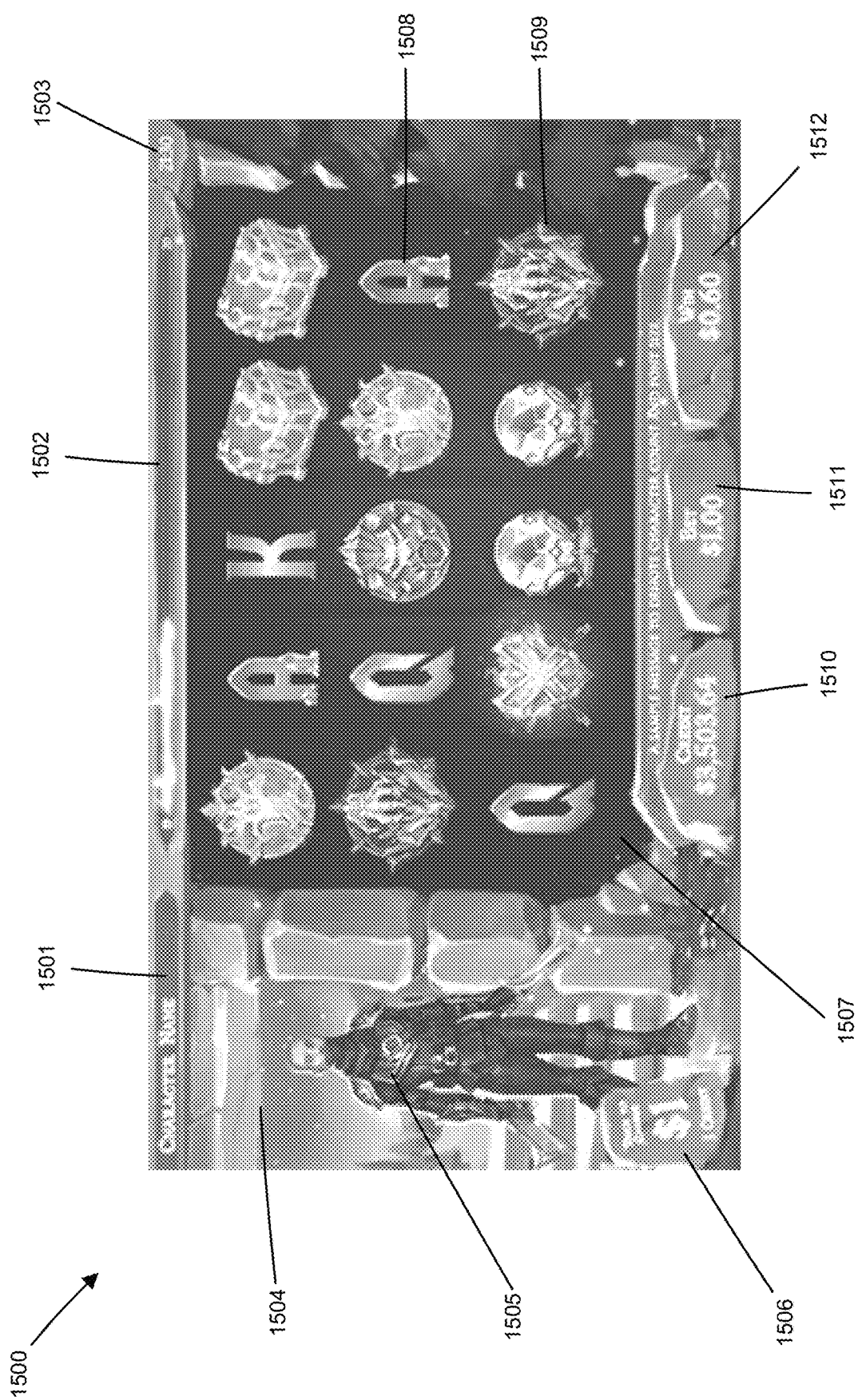
FIG. 15 is an example screenshot of a base game screen based on a particular class selection.

FIG. 15 is a further example screenshot of a base game screen 1500 of gaming machine 100, as generated by base game module 411 based on information read by processor 202 from symbol data 401. Screen 1500 displays a character name 1501, progress meter 1502, game time 1503, bet amount 1506, and symbol sets 1507 for a base game. Symbol sets 1507 may include alpha-numeric symbols 1508 as well as pictorial symbols 1509, and are described in further detail below with reference to FIGS. 9 and 10. Screen 1500 also displays a selected character 1505 on a background 1504, and credit, bet and win meters 1510, 1511 and 1512 which may display an amount of credit that a player has, an amount bet, and an amount won in a particular gaming session. Selected character 1505 may be a character selected by the player using character selection screen 600. Base game screen 1500 shows how the appearance of the base game may be changed by the selection of a character class. Based on a selected class, map location, or character for game play, aspects of the base game screen are modified. These aspects may include the background, virtual buttons, reel symbols, font, theme music and other visual and audible aspects. For example, in the illustrated example, the background 1505 and the border for the symbol set 1507 show a background that is thematically linked to the chosen character class.

Figure 16:
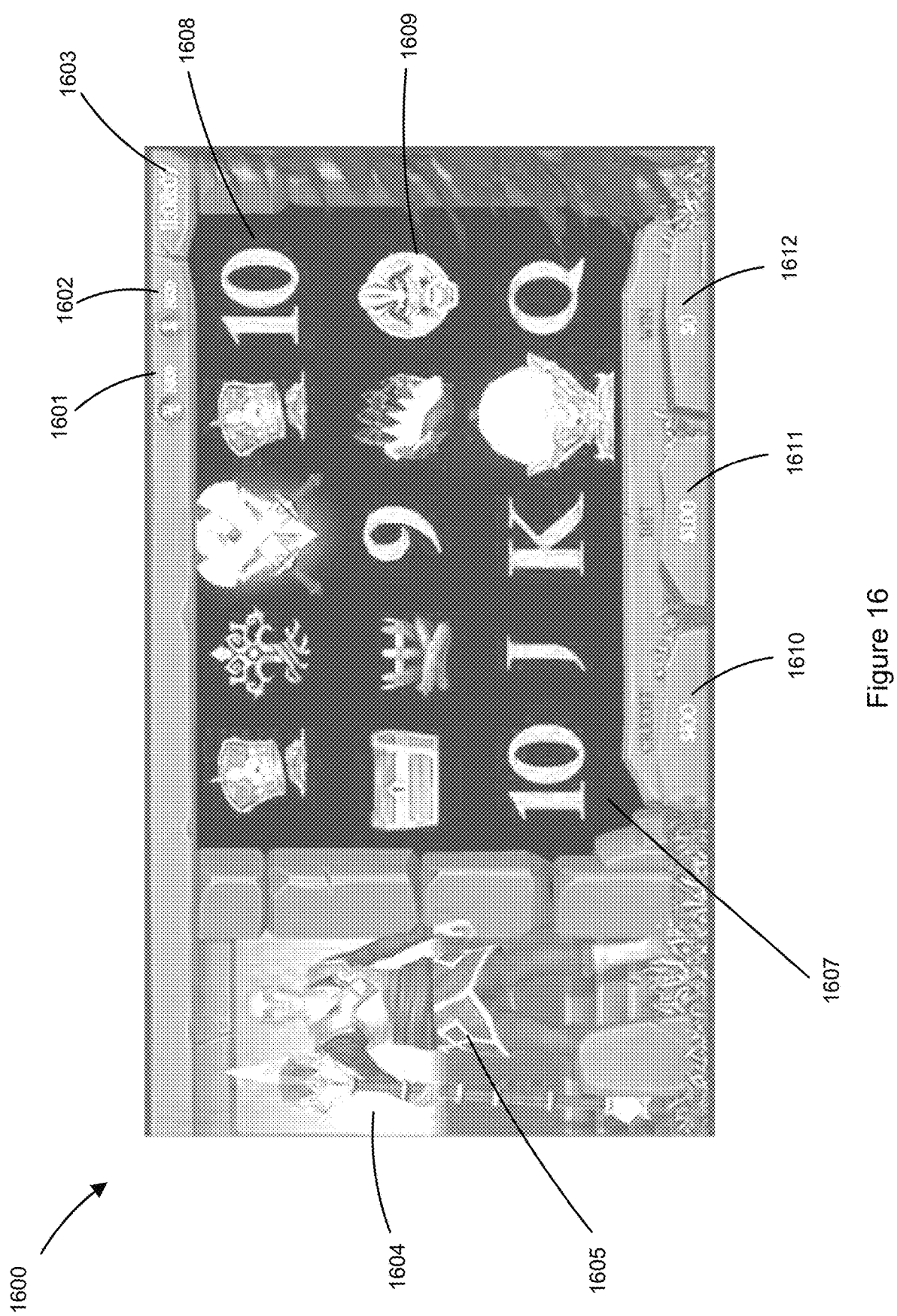
FIG. 16 is an example screenshot of a base game screen based on an alternative class selection.

FIG. 16 is another example screenshot of a base game screen 1600 of gaming machine 100, as generated by base game module 411 based on information read by processor 202 from symbol data 401. Screen 1600 displays a first credit meter 1601, a second credit meter 1602, game time 1603 and symbol sets 1607 for a base game. According to some embodiments, play of the meta-game may result in the player being awarded two different forms of virtual currency or credit, as displayed by meters 1601 and 1602. According to some embodiments, the different credit types may be used to purchase different types of items, as described below with reference to FIGS. 18 and 21. Symbol sets 1607 may include alpha-numeric symbols 1608 as well as pictorial symbols 1609, and are described in further detail below with reference to FIGS. 9 and 10. Screen 1600 also displays a selected character 1605 on a background 1604, and credit, bet and win meters 1610, 1611 and 1612 which may display an amount of credit that a player has, an amount bet, and an amount won in a particular gaming session. Selected character 1605 may be a character selected by the player using character selection screen 600. Base game screen 1600 shows how the appearance of the base game may be changed by the selection of a character class. For example, in the illustrated example, the background 1605 and the border for the symbol set 1607 are different to those shown in FIG. 15, and are thematically linked to the chosen character class as selected for FIG. 16.

Figure 9:
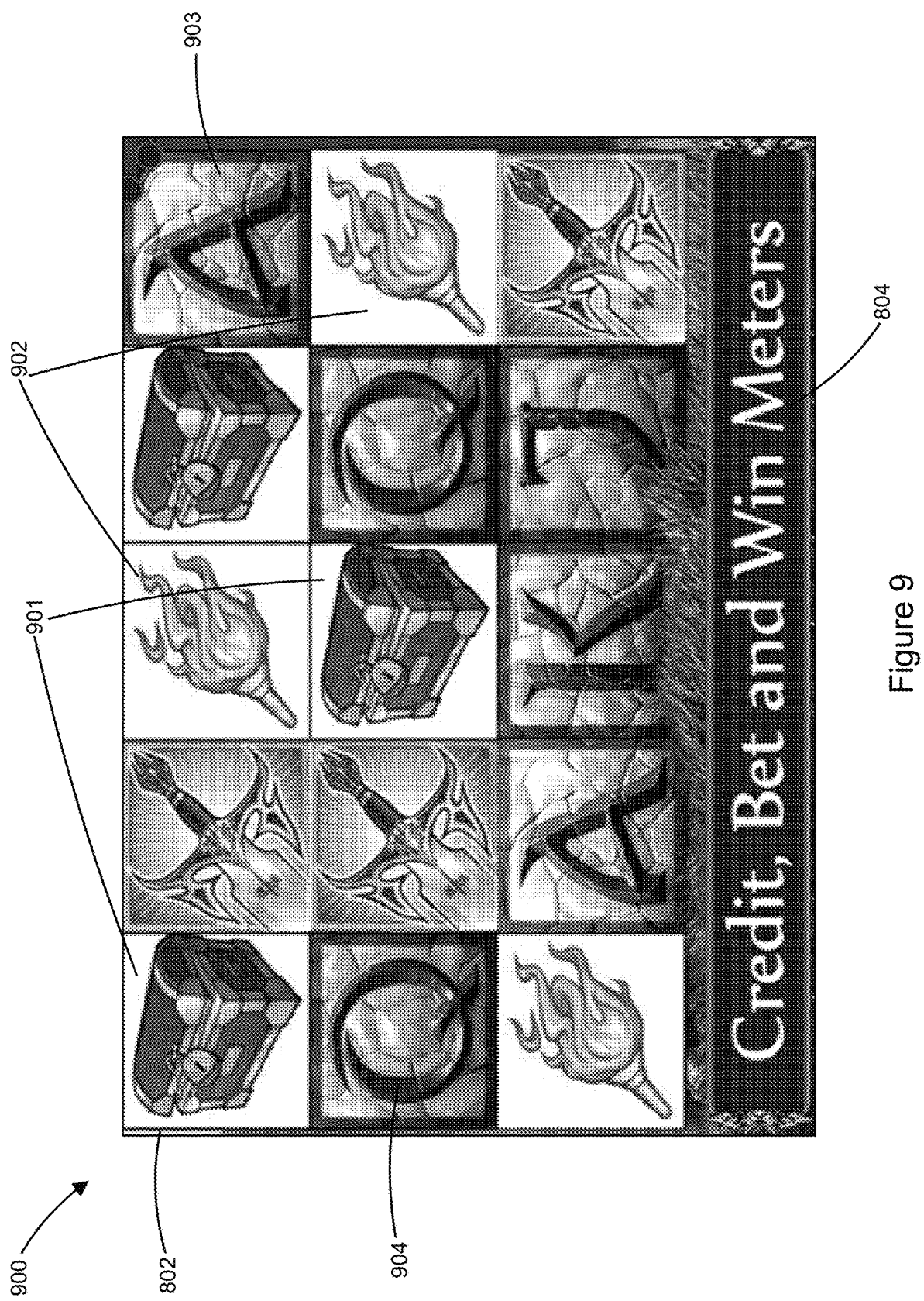
FIG. 9 is a detailed view of the symbol sets shown in FIG. 8.

FIG. 9 is a detailed view 900 of symbol sets 802. Symbol sets 802 display a number of symbols as generated by processor 202 based on symbol data 401. The symbols may include pictorial symbols, such as treasure chest symbol 901, torch symbol 902, and sword symbol 905 as well as alphanumeric symbols, such as A symbol 903 and Q symbol 904. In some embodiments, the alphanumeric symbols may correspond to cards from a standard deck of cards, such as Ace and Queen for A and Q respectively.

Figure 10:
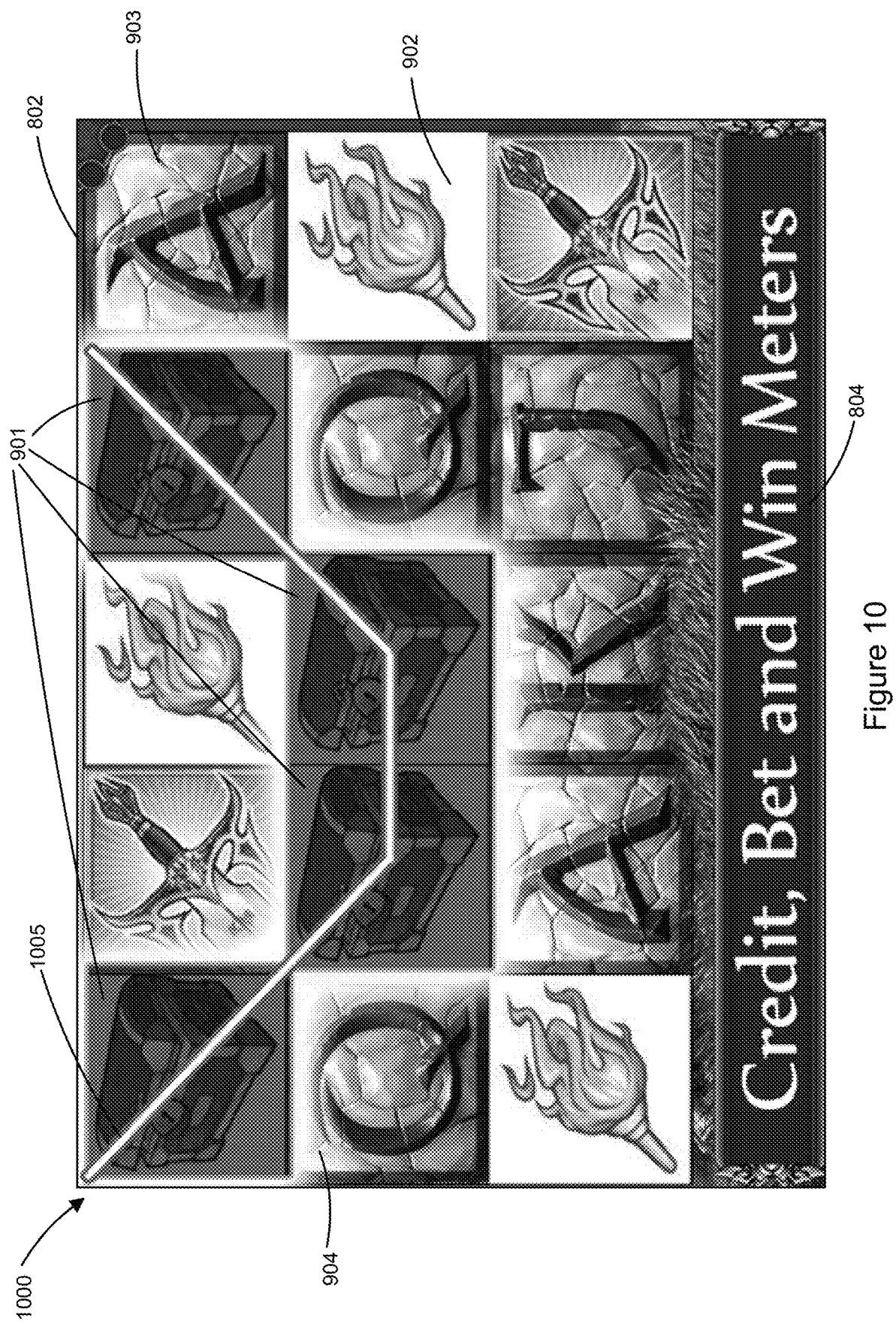
FIG. 10 is an example screenshot of a base game screen.

FIG. 10 is an example screenshot of a base game screen 1000 of gaming machine 100 showing a winning pay-line 1005 as determined by processor 202 based on base game pay-table data 402. The winning pay-line may also appear on symbol sets 802 when the player of gaming machine 100 places a bet and causes symbol sets 802 to generate a set of symbols for display. Four treasure chest symbols 901 are shown intersecting the winning pay-line. The remaining symbols, including symbols 902, 903 and 904 are shown not intersecting the winning pay-line. The winning pay-line may result in the player winning an amount of cash, credits, or other awards from gaming machine 100. In some embodiments the winning pay-line may also result in progress in the meta-game, as described in further detail below with reference to FIGS. 11 to 12C.

Figure 11:
FIG. 11 is an example screenshot of a meta-game task screen.

FIG. 11 is a detailed view 1100 of quest log 807. Quest log 807 tracks a players progression through a meta-game, as controlled by meta-game module 412 based on information from meta-game task data 404, during the play of the base game displayed on symbol sets 802. Quest log 807 shows a number of quests 1101, described as tasks to be completed during the meta-game. The tasks may be tailored to the character, the game scenario and/or the virtual location of the game selected by the player. For example, if a farm location is selected, tasks may include "Defeat 10 boars", "Defend village", and "Repair farmhouse", for example. Each task may be displayed next to a symbol 1102. In some embodiments, the symbols displayed may correspond to symbols of the symbol sets 802, and may be related to the symbols that need to appear on symbol sets 802 in order to complete the tasks. The tasks or quests may include a progress meter 1103, which may show how many more successful symbol appearances are required until the task is completed. Processor 202 may determine what amounts to a successful symbol appearance based on meta-game pay-table data 403. For example, in the illustrated embodiment, each task requires 10 successful symbol appearances to become completed. The "Defend 10 Boars" task has been completed 3 times out of a required 10 times. The "Defend village" and "Repair farmhouse" tasks have been completed 5 and 8 times out of a required 10 times, respectively. In some embodiments, once each or all of the quests have been completed, the player's character may be caused to move up a level, or acquire an increased set of abilities or attributes. In some embodiments, the player may alternatively or in addition be caused to move up a level, or acquire an increased set of abilities or attributes, during the playing of the feature game, by completing objectives or earning points during the feature game.

Figure 17:
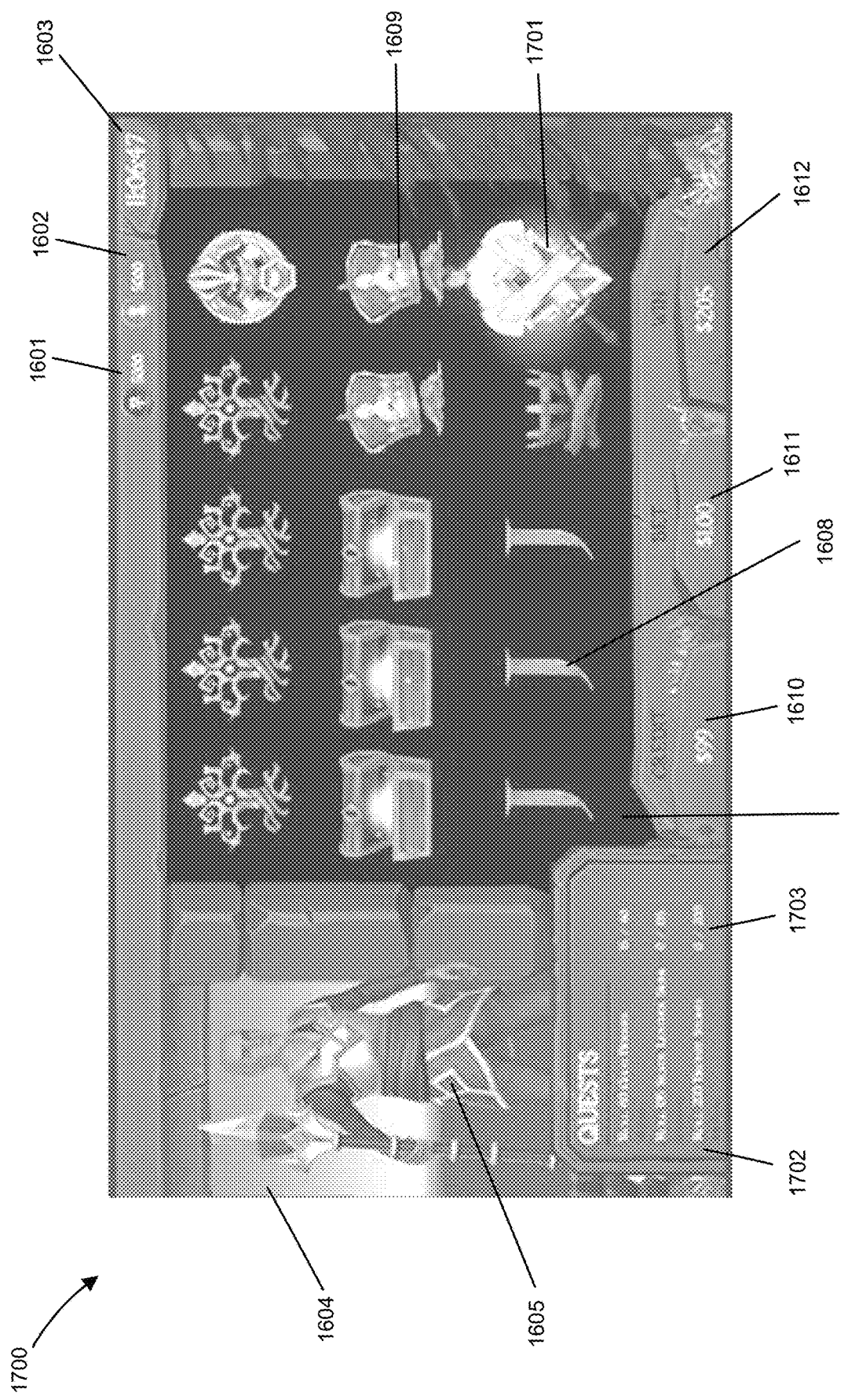
FIG. 17 is an example screenshot of a base game screen showing a quest pop-up box.

FIG. 17 is an example screenshot of a base game screen 1700 of gaming machine 100 showing a pop-up quest log 1702. Pop-up quest log 1702 may be a temporary display portion overlaid on the main display screen. According to some embodiments, pop-up quest log 1702 may be displayed only when progress is made on the meta-game, as described above with reference to FIG. 11. Pop-up quest log may be displayed for a pre-determined period of time after progress is made. In some embodiments, pop-up quest log 1702 may be displayed in response to another game event, or in response to receipt of user input.

Base game screen 1700 shows several of the same features as base game screen 1600 including first credit meter 1601, second credit meter 1602, game time 1603 and symbol sets 1607 for a base game. Symbol sets 1607 may include alpha-numeric symbols 1608 as well as pictorial symbols 1609, and are described in further detail above with reference to FIGS. 9 and 10. A special symbol 1701 is shown as being activated, which may indicate that the appearance of this symbol in the symbol set 1607 progresses at least one quest game as shown in pop-up quest log 1702. Screen 1700 also displays a selected character 1605 on a background 1604, and credit, bet and win meters 1610, 1611 and 1612 which may display an amount of credit that a player has, an amount bet, and an amount won in a particular gaming session. Pop-up quest log 1702 displays the progress 1703 of a plurality of quests, the progress shown as number of special symbols required for completion at the quest, and how many of these special symbols have already been acquired.

FIG. 12A is a detailed view of quest log 807, showing a task being completed. The "Defeat 10 boars" task 1201 is highlighted, as 10 of the 10 required successful symbol appearances have been achieved. Incomplete tasks 1202 are not highlighted.

FIG. 12B is a detailed view of level indicator 806. Level indicator 806 shows a current level 1203 of the player's character, which is Level 1 in the illustrated embodiments. Level indicator 806 also shows a progress bar 1204, showing how much more progress is required in the meta-game and/or in the feature game before the character reaches the next level. Level indicator 806 also displays the next level 1205 for the character to achieve.

FIG. 12C shows an example screenshot of symbol sets 802 showing a winning combination of symbols 1206 as determined by processor 202 based on meta-game pay-table data 403, highlighting a winning meta-game combination. Symbols that are not part of the winning combination, such as symbols 1207, are not highlighted. Based on the combination of symbols that appear on symbol sets 802, processor 202 determines, based on meta-game pay-table data 403, whether the symbol combinations are winning combinations. A winning combination may result in one or more tasks 1101 (i.e. meta-game objectives) being completed in some embodiments, or progress being made towards the completion of one or more tasks.

Figure 21:
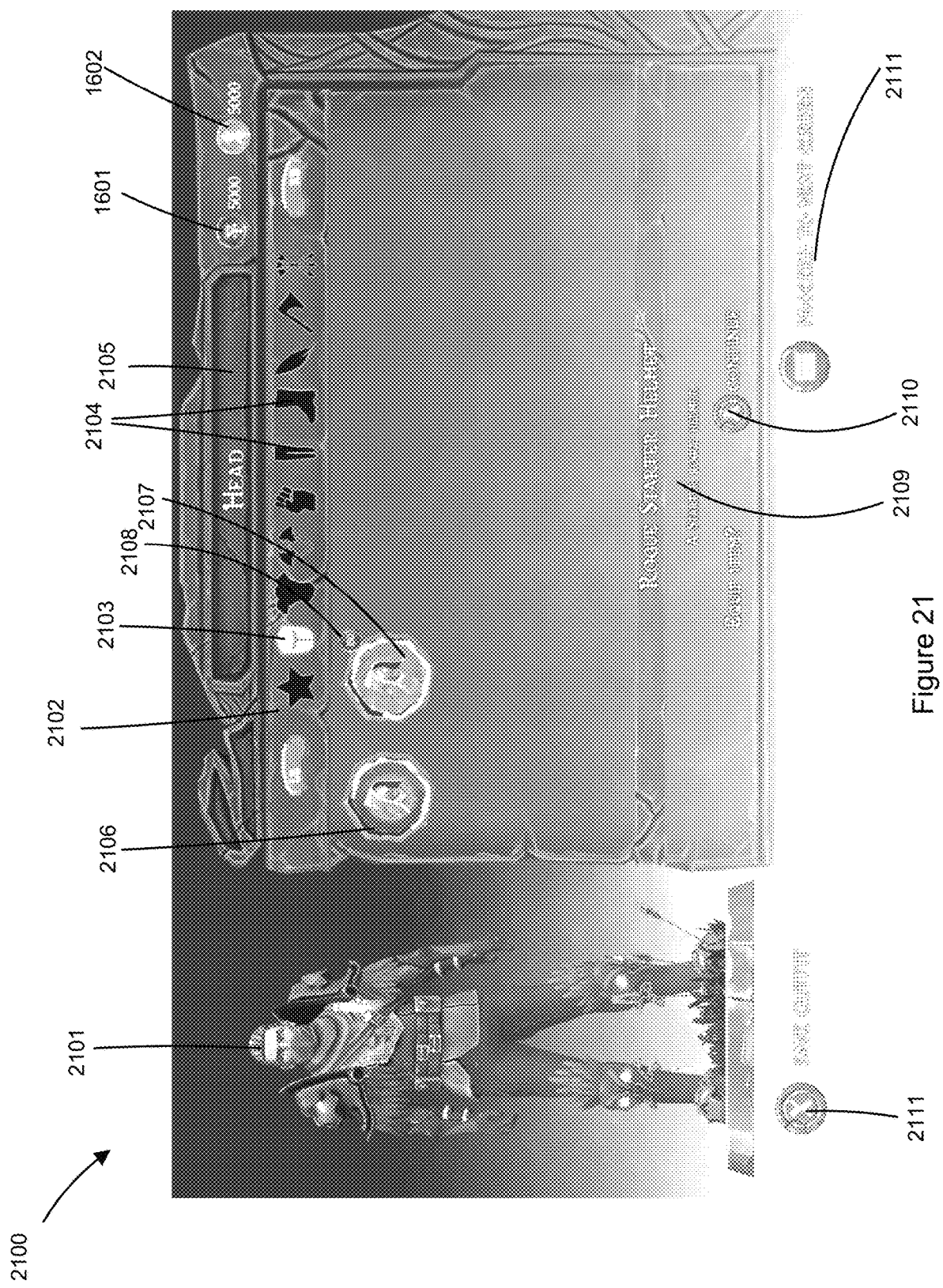
FIG. 21 is an example screenshot of an alternative inventory selection screen.

According to some embodiments, multiple inventory screens may be displayed on gaming machine 100 prior to entry into the feature game to allow the player to purchase consumable and persistent items to use in the feature game. FIG. 21 is an example screenshot of a first inventory game screen 2100 of gaming machine 100 that allows players to purchase persistent items that they can apply to the player's avatar. Once a persistent item has been purchased, it will exist in the player's inventory indefinitely. According to some embodiments, persistent items may be linked to a player's account, so that the persistent items are available to a player even when the player starts a new gaming session on a new gaming machine 100, provided the player logs into the player's account on that machine.

Screen 2100 shows the player avatar 2101. According to some embodiments, as the player selects items to equip the player's character or avatar with, the items may appear on avatar 2101 so that the player can see what the avatar would look like with the item equipped. Screen 2100 also shows a page selector 2102 including a number of pages of items a player can purchase or select. The currently selected page 2103 appears as highlighted, while unselected pages 2104 are not highlighted. Each page may relate to a category of available items, and the title of the selected page may be displayed as title 2105. For example, in the illustrated embodiment, the "head" page is selected, which may relate to items worn on the player's head. Other categories may include upper body, lower body, hands, feet, and weapons, for example.

On each page, a number of items 2106 and 2107 are displayed that a player can purchase or add to their inventory. For example, according to the illustrated embodiments, two different helmets 2106 and 2107 are shown. Item 2106 represents an item that the player has previously purchased or been awarded, and is available in the player's inventory for the player to selectively apply to the avatar 2101. Item 2107 represents an item available for purchase by the player. A cost 2108 of the item is displayed to the player, indicating how much credit is required to purchase the item. When the player selects an item 2106 or 2107, a description 2109 of the item may be displayed. If the player elects to apply the item to avatar 2101, the player may equip the item by activating virtual continue button 2110.

Screen 2100 also displays first credit meter 1601, and second credit meter 1602. According to some embodiments, only the first type of credit, as shown by meter 1601, may be used to purchase the persistent items as displayed on screen 2100. If a player makes a virtual purchase on screen 2100, the credit indicator 1601 is decreased by the cost of the virtual purchase. For example, if the cost of helmet 2107 is 150 virtual credits as indicated by cost 2108, then when a player purchases helmet 2107, 150 virtual credits are subtracted from the player's virtual credit amount as indicated by credit indicator 1601.

Once a player has made all of their desired selections, the player may activate virtual button 2111 to save the outfit. Once saved, the selection of items that make up the outfit may be automatically loaded onto avatar 2101 each time the player starts the feature game. The player may activate a virtual "next screen" button 2112 to proceed to the next screen, which may be second inventory game screen 1800 in some embodiments.

Figure 18:
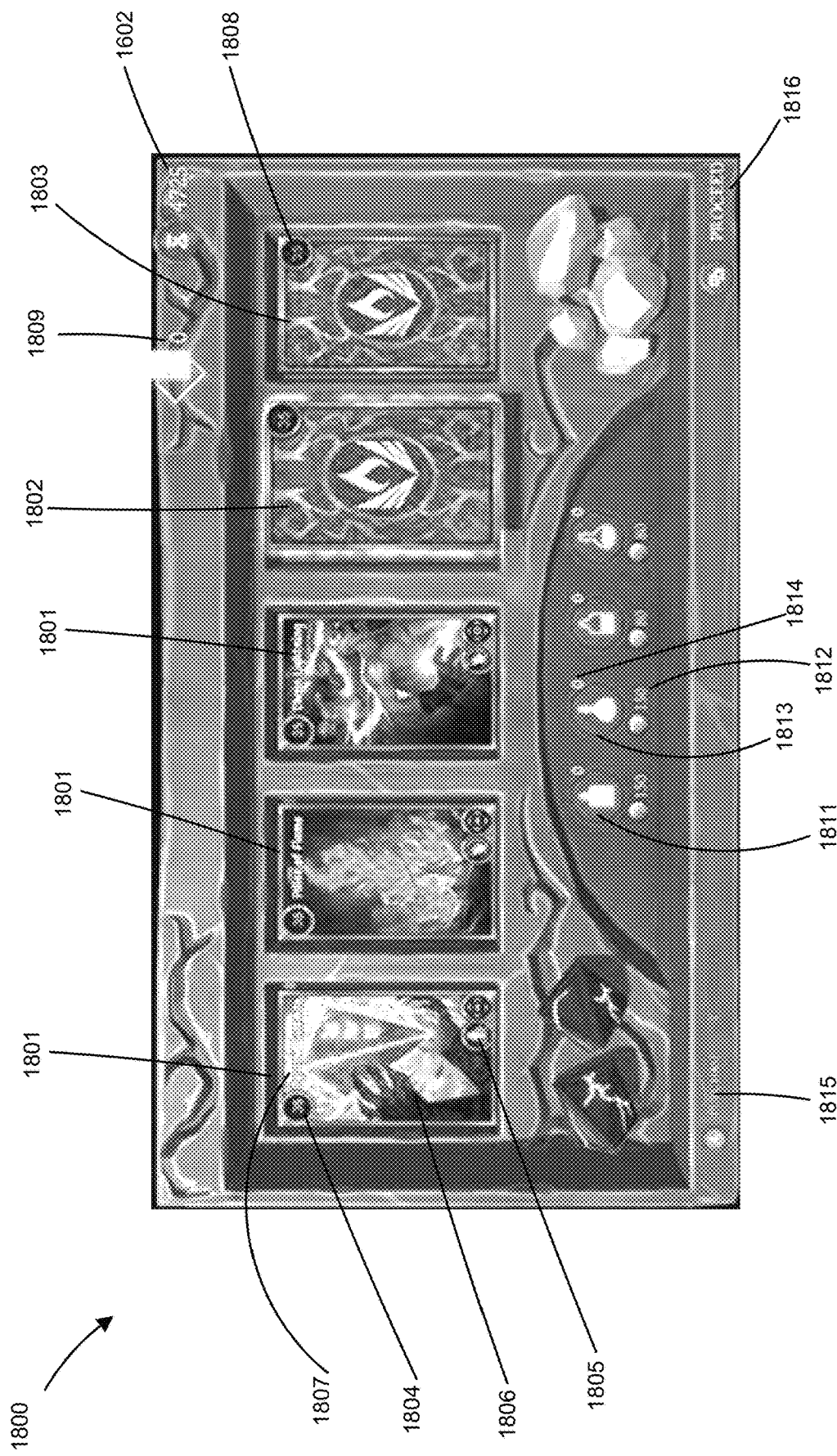
FIG. 18 is an example screenshot of an inventory selection screen.

FIG. 18 is an example screenshot of a second inventory game screen 1800 of gaming machine 100, that allows players to purchase consumable items that the player can use only during a limited period, such as during the feature game. According to some embodiments, once a consumable item has been purchased, it will be available for use only in one subsequent feature game. Once the feature game is over, the item will be removed from the player's virtual inventory, even if the item was not used. Screen 1800 shows a number of items a player can purchase or add to their inventory, including skills or attributes that can be applied to their avatar, represented by cards 1801, 1802 and 1803, as well as potions 1811. A player may be able to purchase an item by selecting the item and then activating purchase button 1815. According to the illustrated embodiments, player abilities are represented by cards, while consumable items are represented by potions. According to some embodiments, different virtual items may be used to represent player abilities and consumables, such as skill "certificates", pages of a spell book, pills, wearable items, or other representations.

Screen 1800 includes a plurality of images of two-sided cards 1801, 1802 and 1803, with cards 1801 being face side up and cards 1802 and 1803 being back side up, with the content on the face of cards 1802 and 1803 being concealed. Cards 1801 relate to cards that have been purchased, selected or revealed by the player, and relate to one or more special skills or attributes that a player can apply to their player avatar during a feature game. The face of each card may include a cost 1804 of selecting and revealing the card, one or more symbols 1805 relating to the type of the card, an image 1806 relating to the skill or attribute that the card represents, and a title 1807 of the skill or attribute.

Cards 1802 and 1803 represent cards that have not yet been purchased or revealed by the player, and show only a cost 1808 for purchasing and revealing the card. Card 1802 shows a card that is currently selected, as shown by the card being slightly raised with respect to the virtual background. According to some embodiments, the card type and the skill represented by an unflipped card may be unknown to the player. A player may take a chance in purchasing the card in the hope that it represents a desirable skill. In some embodiments, a player may be able to see the face side of the card before electing whether or not to purchase the card and the represented skill or attribute.

Screen 1800 also shows a discard indicator 1809 which shows how many card discards a player can make, and second credit meter 1602 which shows how much of the second virtual credit type is available to a player. According to some embodiments, the second type of virtual credit may only be used to purchase consumable items, and not persistent items. If a player reveals a card 1801 which the player does not desire, the player can elect to discard it and be dealt a new card. According to some embodiments, a player may be given only a limited number of discards, so that each time the player elects to discard a card 1801, the number shown on discard indicator 1909 is decremented. If a player makes a virtual purchase on screen 1800, the credit indicator 1602 is decreased by the cost of the virtual purchase. For example, if the cost of card 1801 is 35 virtual credits as indicated by cost 1804, then when a player purchases card 1801, 35 virtual credits are subtracted from the player's virtual credit amount as indicated by credit indicator 1602.

Screen 1800 further shows one or more consumable items in the form of potions 1811 that can be purchased by a player for use during the feature game. Each potion may have a cost 1812, a symbol 1813 and a quantity 1814. Symbol 1813 may indicate the type of potion, as well as the amount of potion being purchased. For example, symbol 1813 maybe a differently shaped bottle depending on whether the potion is a health potion, a strength potion, an invisibility potion, or another type of portion. Symbol 1813 may show a full bottle to show a full dose of a potion, or a half full bottle if the potion is only half a dose, which may only have half the effect on the player's avatar during the feature game. The quantity 1814 shows the number of the particular potion that the player has already purchased and has in the player's inventory.

Once a player has made all of the player's desired purchases, the player may activate virtual button 1816 to proceed.

Figure 13:
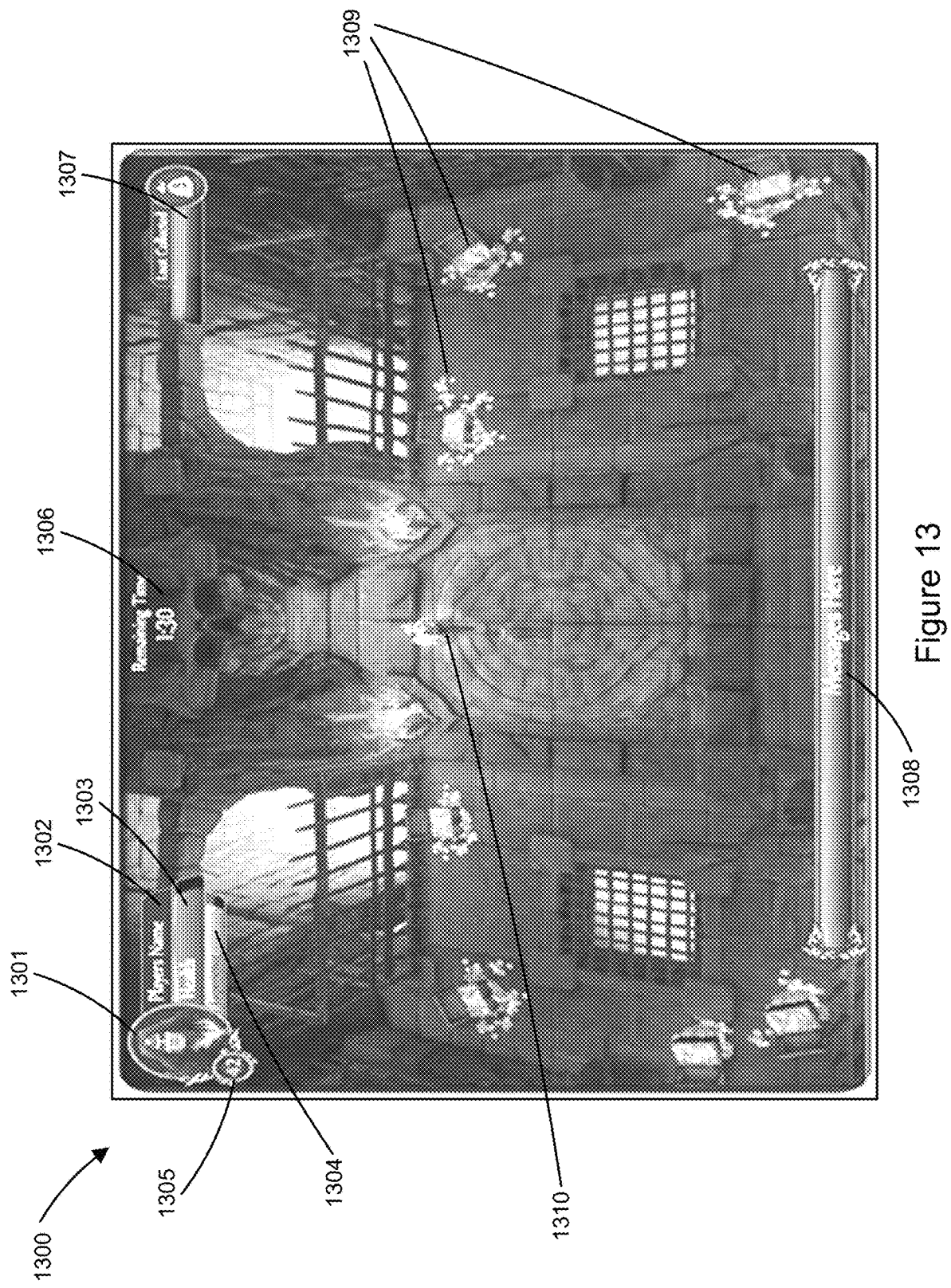
FIG. 13 is an example screenshot of a feature game screen.

FIG. 13 is an example screenshot of a feature game screen 1300 of gaming machine 100. Screen 1300 includes a character information display portion, including an image of the character 1301, the character name 1302, an indication of the character's health 1303, an indication of the character's experience 1304, and a number of points achieved by the player 1305. Screen 1300 also shows a countdown timer 1306 showing the time remaining for a player to navigate through the virtual environment in order to collect rewards before the feature game ends. In some embodiments, the feature game may end when timer 1306 runs out, or when the player's health 1303 runs out, whichever occurs first. The amount of rewards collected by the player is shown by reward meter 1307. Messages may be displayed to a player playing the feature game using message bar 1308. As the player navigates character 1310 through the virtual environment shown using user input 218, the character may interact with objects in the environment, such as treasure chests 1309 or other reward-triggering objects. Opening treasure chests 1309 may allow the player to accumulate rewards, points or other awards. In some embodiments, the rewards may be transferrable for cash or credits at the end of the game. In some embodiments, chests 1309 may contain non-monetary rewards, such as clothing, weapons, or other modifications to the character 1310. In some embodiments, the player may also be able to interact with other characters or objects in the feature game, such as by fighting bosses, villains or monsters, opening locks or doors, tripping traps, or solving puzzles, for example.

Figure 19:
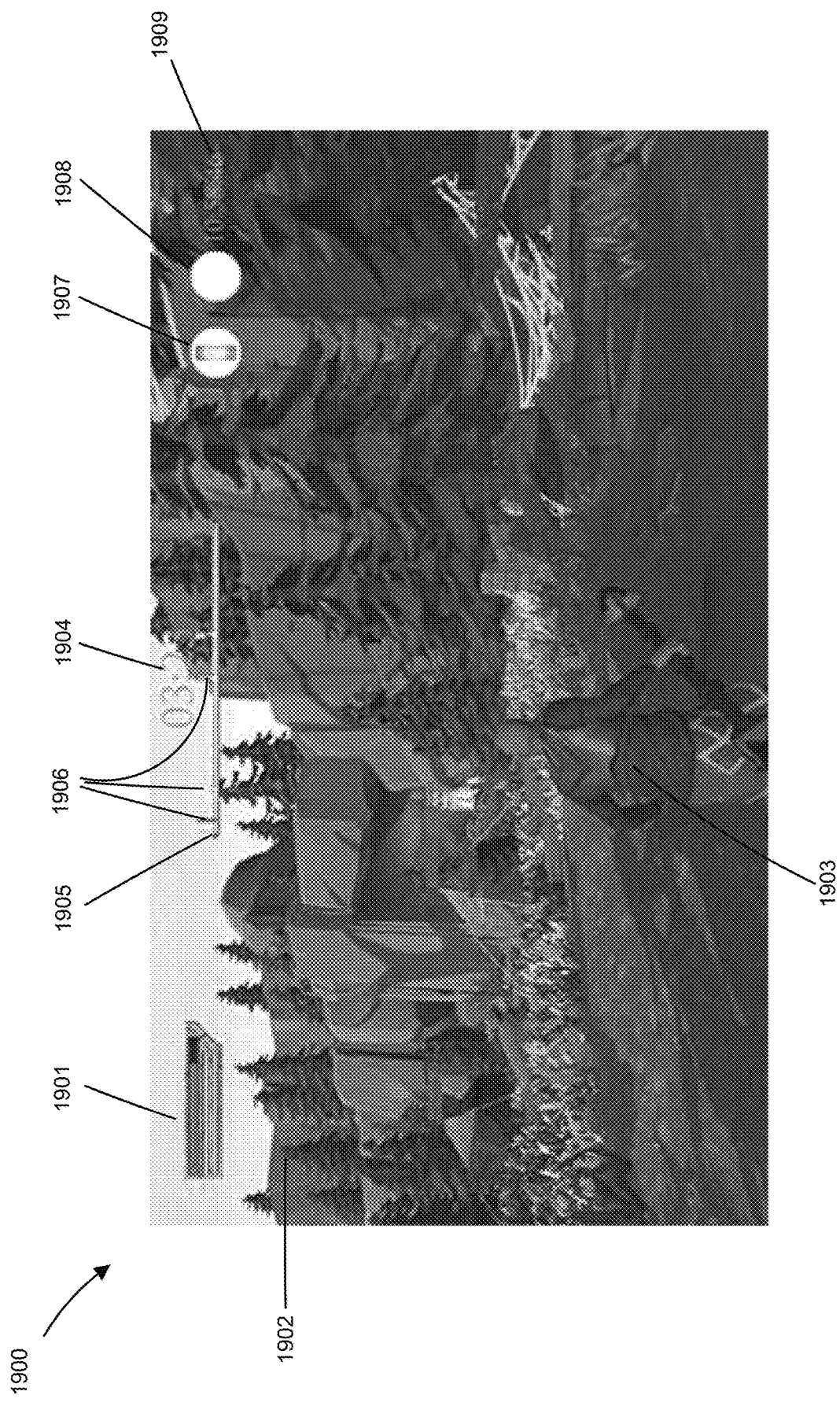
FIG. 19 is an example screenshot of a feature game showing an enemy tracking feature.

FIG. 19 is an example screenshot of an alternative feature game screen 1900 of gaming machine 100. Screen 1900 relates to a first person battle-type game. Screen 1900 includes a character information display portion 1901, which may be used to display health, strength, and/or other character attributes during the game. Screen 1900 also shows a virtual environment 1902 and the character avatar 1903, which the player can navigate through the virtual environment to achieve goals or tasks, such as defeating enemies. A countdown timer 1904 shows the time remaining for the game. In some embodiments, the feature game may end when timer 1904 runs out, or when the player's health runs out, whichever occurs first. According to some embodiments, when a player's character runs out of health, the character may re-spawn, and the game may continue until the timer runs out. Screen 1900 also shows an active skill card indicator 1907 and an active potion indicator 1908. Indicators 1907 and 1908 show skill cards and potions that an avatar has in its inventory which can be used during the feature game in play. A clock 1909 may display the real-world time to the player.

As the player navigates character 1903 through virtual environment 1902, enemies may appear for the player to battle. Defeating enemies may increase the player's score, while being defeated or taking damage from the enemies may decrease their score. According to some embodiments, screen 1900 may display an enemy tracker 1905. Enemy tracker 1905 may give the player a quick visual representation of where enemies may be located in virtual environment 1902, by displaying the location of enemies as a bar 1906 along a one dimensional location indicator. According to some embodiments, enemy tracker 1905 may indicate a direction of enemies within virtual environment 1902, but not the distance of the enemies from character 1903.

Figure 20:
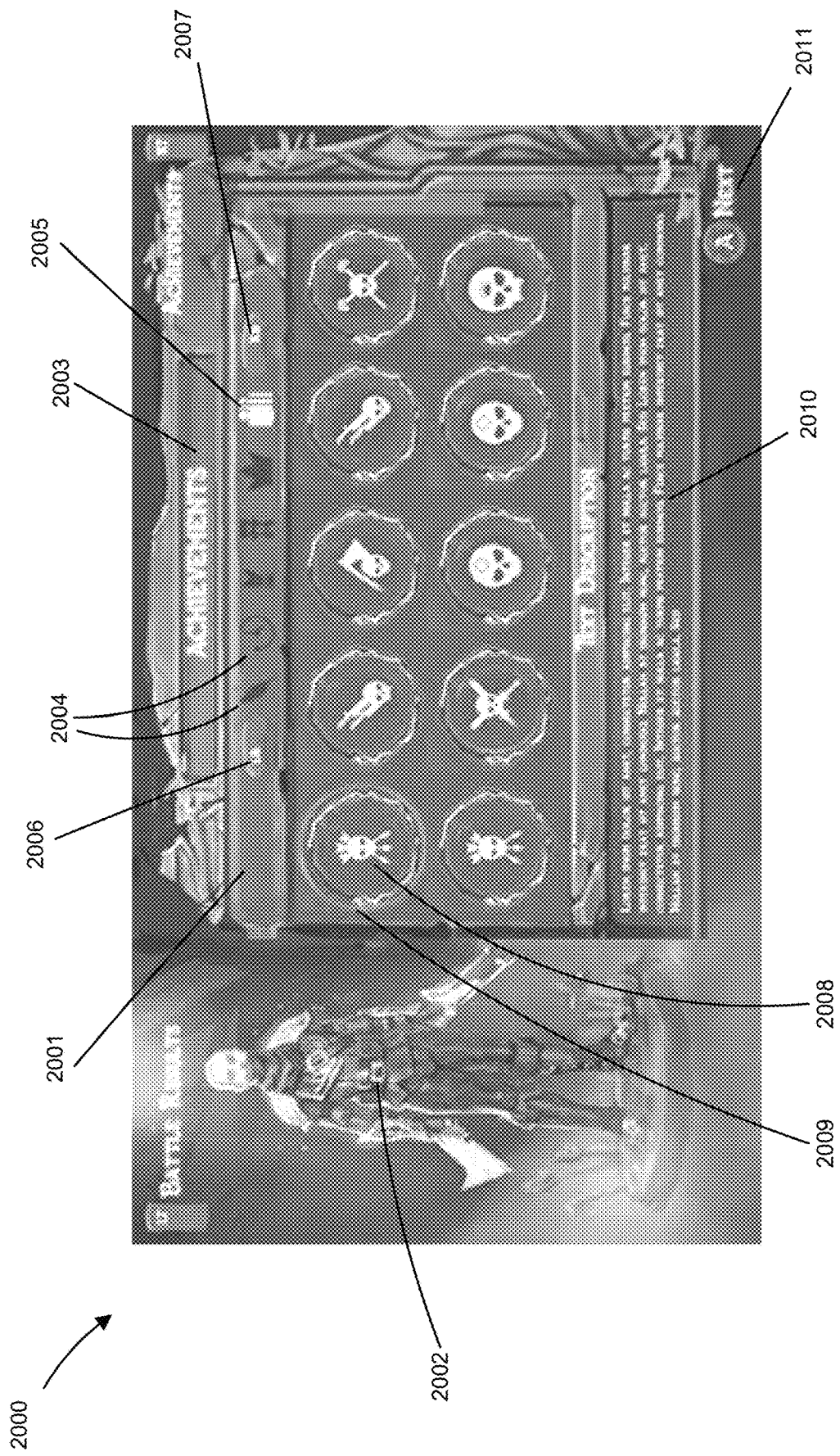
FIG. 20 is an example screenshot of an achievement screen.

FIG. 20 is an example screenshot of an achievement screen 2000 of gaming machine 100. Screen 2000 may be displayed after play of the feature game, to show scores, achievements, and money won during the feature game. Screen 2000 shows an achievements board 2001 and a representation of a player's character 2002. Achievements board 2001 has a title 2003, and a series of selectable pages 2004, including a currently selected page 2005. The symbol for the currently selected page is shown as highlighted. A player may be able to flip through pages 2004 using controls 2006 and 2007. The selected page 2005 shows a number of achievement icons 2008 as well as a progress meter 2009 for each achievement. Progress meter 2009 may show how far the player is from a particular achievement. For example, if one achievement is to defeat 10 enemies, and the player defeated 5 enemies, progress meter 2009 may be half full for that achievement. A text description 2010 of each achievement 2008 may also be displayed when the player highlights or selects the achievement.

Once the player has finished viewing the player's achievements, the player may activate virtual button 2011 to proceed back to the base reel game, as described above with reference to FIG. 14.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive. Embodiments disclosed herein comprise the following numbered embodiments:

1. A gaming machine, comprising:
   at least one processor;
   memory storing executable program code;
   at least one display to display game-related images; and
   input components to receive player input;
   wherein the at least one processor is configured to execute the program code to:
      execute a first game in response to player input, the first game being a game of chance,
      execute a meta-game, wherein the meta-game defines at least one meta-game objective and wherein progression through the meta-game towards the at least one meta-game objective is related to results of game play in the first game.

2. The gaming machine of embodiment 1, wherein the first game is executed simultaneously with the meta-game.

3. The gaming machine of embodiment 1, wherein the first game is executed before the meta-game.

4. The gaming machine of embodiment 1, wherein the first game is executed after the meta-game.

5. The gaming machine of any one of embodiments 1 to 4, wherein progression through the meta-game towards the at least one meta-game objective is based on results of game play in the game of chance 6. The gaming machine of any one of embodiments 1 to 4, wherein results of game play in the game of chance are based on progression through the meta-game.

7. The gaming machine of any one of embodiments 1 to 6, wherein the at least one processor is configured to execute the program code to execute a second game that involves application of player skill.

8. The gaming machine of embodiment 7, wherein the second game is executed only after at least one game play of the first game.

9. The gaming machine of embodiment 7 or embodiment 8, wherein at least one aspect of game play in the second game is affected by achievement of the at least one meta-game objective.

10. The gaming machine of embodiment 7, wherein the first game is executed only after at least one game play of the second game.

11. The gaming machine of embodiment 7 or embodiment 10, wherein the achievement of at least one meta-game objective is affected by at least one aspect of game play in the second game.

12. A gaming machine of any one of embodiments 1 to 11, wherein the meta-game and the second game share a common theme.

13. The gaming machine of embodiment 12, wherein the second game allows user control of a game avatar to participate in the second game.

14. The gaming machine of embodiment 13, wherein achievement of the at least one meta-game objective affects at least one attribute of the game avatar.

15. The gaming machine of embodiment 13 or embodiment 14, wherein achievement of the at least one meta-game objective contributes to advancement of the game avatar towards a game avatar advancement milestone.

16. The gaming machine of any one of embodiments 1 to 15, wherein a first winning result in game play of the first game contributes to achievement of the at least one meta-game objective.

17. The gaming machine of embodiment 16, wherein the at least one meta-game objective comprises a plurality of meta-game objectives.

18. The gaming machine of embodiment 16 or 17, wherein the first winning result is one of a set of possible first winning results.

19. The gaming machine of any one of embodiments 16 to 18, wherein a second winning result in game play of the first game contributes to or results in monetary reward to a game player.

20. The gaming machine of embodiment 19, wherein the second winning result is one of a set of possible second winning results.

21. The gaming machine of any one of embodiments 16 to 20, wherein the first winning result does not directly result in monetary reward to a game player.

22. The gaming machine of embodiment 7 or any one of embodiments 8 to 20 when directly or indirectly dependant on embodiment 7, wherein a third winning result in the second game depends at least in part on player skill.

23. The gaming machine of embodiment 22, wherein the third winning result results in a monetary reward to a game player.

24. The gaming machine of embodiment 22 or embodiment 23, wherein the third winning result results in a non-monetary reward to the game player.

25. The gaming machine of embodiment 24, wherein the non-monetary reward comprises at least one additional attribute or increased attribute of a game avatar.

26. The gaming machine of any one of embodiments 22 to 25, wherein exercise of player skill in controlling the game avatar within a virtual environment of the second game is required to achieve the third winning result.

27. The gaming machine of embodiment 26, wherein the virtual environment of the second game comprises a navigable environment in which actions of the game avatar can be controlled by received player input.

28. The gaming machine of any one of embodiments 1 to 27, wherein the first game comprises a reel game in which a single game play results in random selection of a set of symbols for display on the display means.

29. The gaming machine of embodiment 28, wherein progression toward achievement of each of the at least one meta-game objectives is advanced by occurrence of at least one predetermined symbol selection within the set of symbols.

30. The gaming machine of any one of embodiments 1 to 29, wherein progression in the at least one meta-game is not dependent on received player input.

31. The gaming machine of embodiment 7 or any one of embodiments 8 to 30 when dependant on embodiment 7, wherein the at least one processor is configured to execute the program code to initiate the second game according to a timing criterion that is independent of progression towards the at least one meta-game objective.

32. The gaming machine of embodiment 31, wherein when the timing criterion is satisfied, the at least one processor allows receipt of player input to initiate the second game.

33. A method of executing game play on a gaming machine, the method comprising:
    executing a first game in response to player input, the first game being a game of chance; and
    executing a meta-game, wherein the meta-game defines at least one meta-game objective and wherein progression through the meta-game towards the at least one meta-game objective is related to game play in the first game;
    wherein the gaming machine comprises at least one processor, memory storing executable program code, at least one display to display game-related images, and input components to receive player input.

34. The method of embodiment 33, wherein the first game is executed simultaneously with the meta-game.

35. The method of embodiment 33, wherein the first game is executed before the meta-game.

36. The method of embodiment 33, wherein the first game is executed after the meta-game.

37. The method of any one of embodiments 33 to 36, wherein progression through the meta-game towards the at least one meta-game objective is based on results of game play in the game of chance.

38. The method of any one of embodiments 33 to 36, wherein results of game play in the game of chance are based on progression through the meta-game.

39. The method of any one of embodiments 33 to 38, further comprising executing a second game that involves application of player skill.

40. The method of embodiment 39, wherein the step of executing the second game is only performed only after at least one game play of the first game.

41. The method of embodiment 39 or embodiment 40, wherein at least one aspect of game play in the second game is affected by achievement of the at least one meta-game objective.

42. The method of embodiment 39, wherein the first game is executed only after at least one game play of the second game.

43. The method of embodiment 39 or embodiment 42, wherein the achievement of at least one meta-game objective is affected by at least one aspect of game play in the second game.

44. The method of any one of embodiments 33 to 43, wherein the meta-game and the second game share a common theme.

45. The method of embodiment 44, wherein the second game allows user control of a game avatar.

46. The method of embodiment 45, further comprising modifying at least one attribute of the game avatar in response to achievement of the at least one meta-game objective.

47. The method of embodiment 45 or embodiment 46, further comprising advancing the game avatar towards a game avatar advancement milestone in response to achievement of the at least one meta-game objective.

48. The method of any one of embodiments 33 to 47, further comprising causing achievement of the at least one meta-game objective in response to a first winning result in game play of the first game.

49. The method of embodiment 48, wherein the at least one meta-game objective comprises a plurality of meta-game objectives.

50. The method of embodiment 48 or 49, wherein the first winning result is one of a set of possible first winning results.

51. The method of any one of embodiments 48 to 50, further comprising awarding a monetary reward to a game player in response to a second winning result in game play of the first game.

52. The method of embodiment 51, wherein the second winning result is one of a set of possible second winning results.

53. The method of any one of embodiments 48 to 52, wherein the first winning result does not directly result in monetary reward to a game player.

54. The method of embodiment 39 or any one of embodiments 40 to 49 when directly or indirectly dependant on embodiment 39, wherein a third winning result in the second game depends at least in part on player skill.

55. The method of embodiment 54, further comprising awarding a monetary reward to a game player in response to the third winning result.

56. The method of embodiment 54 or embodiment 55, further comprising awarding a non-monetary reward to a game player in response to the third winning result.

57. The method of embodiment 56, wherein the non-monetary reward comprises at least one additional attribute or increased attribute of a game avatar.

58. The method of any one of embodiments 54 to 57, wherein exercise of player skill in controlling the game avatar within a virtual environment of the second game is required to achieve the third winning result.

59. The method of embodiment 58, wherein the virtual environment of the second game comprises a navigable environment in which actions of the game avatar can be controlled by received player input.

60. The method of any one of embodiments 33 to 59, wherein the first game comprises a reel game in which a single game play results in random selection of a set of symbols for display on the display means.

61. The method of embodiment 60, further comprising advancing progression toward achievement of each of the at least one meta-game objectives in response to an occurrence of at least one predetermined symbol selection within the set of symbols.

62. The method of any one of embodiments 33 to 61, wherein progression in the at least one meta-game is not dependent on received player input.

63. The method of embodiment 39 or any one of embodiments 40 to 62 when dependant on embodiment 39, further comprising initiating the second game according to a timing criterion that is independent of progression towards the at least one meta-game objective.

64. The method of embodiment 63, further comprising allowing receipt of player input to initiate the second game when the timing criterion is satisfied.

65. A non-transitory computer-readable medium including contents that are configured, when executed, to cause a host computing system to perform the method of any of embodiments 33 to 64.

While the foregoing description has been provided by way of example of the preferred embodiments as presently contemplated, which utilise gaming machines of the type found in casinos, those skilled in the relevant arts will appreciate that described embodiments also may have application to internet gaming and/or have application to gaming over a telecommunications network, where mobile handsets are used to display game outcomes and receive player inputs. Such mobile devices include smart phones, notebooks, tablets, iPads and laptop computers. For instance free mobile device games may be offered for download and play on a player's personal mobile device as a bonus game play. In some embodiments, these downloads may be made available on a server accessible via an internet connection. In some embodiments, gaming machine 100/304 may comprise a communication interface to enable interaction and data transfer between the personal mobile devices and gaming machine 100/304, to allow downloads from gaming machine 100/304 to the personal mobile device. The communication interface may be a wireless interface in some embodiments.

Further embodiments may enable a player to upload the outcome of a game or bonus game to a social media site(s), post tournament scores etc.

Certain steps in the processes or process flows described in this disclosure naturally precede others for the embodiments to function as described. However, embodiments are not limited to the order of the steps described if such order or sequence does not alter the functionality of the described embodiments. That is, it is recognized that some steps may performed before, after, or parallel (substantially simultaneously with) other steps without departing from the scope and spirit of the present disclosure. In some instances, certain steps may be omitted or not performed. Further, words such as "thereafter", "then", "next", etc. are not intended to limit the order of the steps. These words are simply used to guide the reader through the description of the exemplary method.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

The invention claimed is:

1. A computing system including a virtual environment hosting a player avatar, comprising:
   at least one processor;
   memory storing executable program code;
   at least one payout mechanism;
   at least one display to display game-related images; and
   at least one tactile input mechanism configured to receive user input from a player, wherein the tactile input mechanism is configured to translate physical motion to a relative position on the at least one display;
   wherein the at least one processor is configured to execute the program code to:
      randomly select a symbol sub-set for display on the at least one display;
      based on the randomly selected symbol sub-set, determine a game outcome for a first game in response to the user input, the first game being a game of chance;
      based on the randomly selected symbol sub-set, determine a game progression outcome for a meta-game, wherein the meta-game defines at least one meta-game objective and wherein a successful game progression outcome results in progression through the meta-game towards the at least one meta-game objective, wherein a theme of the meta-game is associated with the virtual environment;

display the game outcome for the first game and the game progression outcome for the meta-game on the at least one display, the game progression outcome for the meta-game being displayed at the same time as the game outcome for the first game;

instruct the payout mechanism to award at least one prize based on the game outcome for the first game;

generate the virtual environment;

present a player avatar on the at least one display within the virtual environment;

present a second game comprising at least one skill activity on the at least one display in association with the player avatar and the virtual environment, the at least one skill activity involving application of player skill via the at least one tactile input mechanism to control the player avatar through the virtual environment;

determine a winning event for the at least one skill activity;

based on the game progression outcome for the meta-game, determine whether to electronically allocate a virtual good for use in association with the player avatar;

record at least one aesthetic attribute of the player avatar to a ticket, wherein the ticket is read by the computing system to load the at least one aesthetic attribute of the player avatar during a subsequent gaming session, and wherein the aesthetic attribute does not affect performance of the player avatar in the second game; and at the end of a gaming session, discard all ability attributes of the player avatar without recording the ability attributes to the ticket, wherein the ability attributes affect the performance of the player avatar in the second game.

2. The computing system of claim 1, wherein at least one aspect of game play in the second game is affected by achievement of the at least one meta-game objective.

3. A gaming machine, comprising:

at least one processor;

memory storing executable program code;

at least one display to display game-related images;

at least one payout mechanism; and at least one tactile input mechanism to receive player input from a player, wherein the tactile input mechanism is configured to translate physical motion to a relative position on the at least one display;

wherein the at least one processor is configured to execute the program code; and wherein, when executed, the program code causes the at least one processor to, in response to receiving a single input signal from the tactile input mechanism:

randomly select a symbol sub-set for display on the at least one display;

based on the randomly selected symbol sub-set, determine a game outcome for a first game, the first game being a game of chance, and based on the randomly selected symbol sub-set, determine a game progression outcome for a meta-game, wherein the meta-game defines at least one meta-game objective and wherein a successful game progression outcome results in progression through the meta-game towards the at least one meta-game objective;

display the game outcome for the first game and the game progression outcome for the meta-game on the at least one display, the game progression outcome for the meta-game being displayed at the same time as the game outcome for the first game;

instruct the payout mechanism to award at least one prize based on the game outcome;

execute a second game that involves application of player skill via the at least one tactile input mechanism to control a player avatar through a virtual environment, wherein at least one aspect of game play in the second game is affected by achievement of the at least one meta-game objective;

record at least one aesthetic attribute of the player avatar to a ticket, wherein the ticket is read by the gaming machine to load the at least one aesthetic attribute of the player avatar during a subsequent gaming session, and wherein the aesthetic attribute does not affect performance of the player avatar in the second game; and at the end of a gaming session, discard all ability attributes of the player avatar without recording the ability attributes to the ticket, wherein the ability attributes affect the performance of the player avatar in the second game.

4. The gaming machine of claim 3, wherein the meta-game and the second game share a common theme.

5. The gaming machine of claim 3, wherein the second game allows the player control of the player avatar to participate in the second game, and wherein achievement of the at least one meta-game objective affects at least one attribute of the game avatar.

6. The gaming machine of claim 3, wherein a first winning result in game play of the first game contributes to achievement of the at least one meta-game objective.

7. The gaming machine of claim 6, wherein a second winning result in game play of the first game contributes to or results in monetary reward to the player paid out via the payout mechanism.

8. The gaming machine of claim 3, wherein the first game comprises a reel game in which a single game play results in random selection of a set of symbols for display on the at least one display.

9. The gaming machine of claim 8, wherein progression toward achievement of each of the at least one meta-game objectives is advanced by occurrence of at least one predetermined symbol selection within the set of symbols.

10. The gaming machine of claim 3, wherein progression in the at least one meta-game is not dependent on the received player input.

11. A method of executing game play on a gaming machine, the method comprising:

randomly selecting a symbol sub-set for display on at least one display of the gaming machine;

based on the randomly selected symbol sub-set, determining a game outcome for a first game, the first game being a game of chance, and based on the randomly selected symbol sub-set, determining a game progression outcome for a meta-game, wherein the meta-game defines at least one meta-game objective and wherein a successful game progression outcome results in progression through the meta-game towards the at least one meta-game objective;

displaying the game outcome for the first game and the game progression outcome for the meta-game on the at least one display, the game progression outcome for the meta-game being displayed at the same time as the game outcome for the first game;

instructing a payout mechanism of the gaming machine to award at least one prize based on the game outcome;

executing a second game that involves application of player skill via at least one tactile input mechanism of the gaming machine to control a player avatar through a virtual environment;

recording at least one aesthetic attribute of the player avatar to a ticket, wherein the ticket is read by the gaming machine to load the at least one aesthetic attribute of the player avatar during a subsequent gaming session, and wherein the aesthetic attribute does not affect performance of the player avatar in the second game; and at the end of a gaming session, discarding all ability attributes of the player avatar without recording the ability attributes to the ticket, wherein the ability attributes affect the performance of the player avatar in the second game.

12. The method of claim 11, wherein at least one aspect of game play in the second game is affected by achievement of the at least one meta-game objective.

13. The method of claim 11, wherein the meta-game and the second game share a common theme.

14. The method of claim 11, wherein the second game allows player control of a game avatar, the method further comprising modifying at least one attribute of the game avatar in response to achievement of the at least one meta-game objective.

15. The method of claim 11, further comprising causing achievement of the at least one meta-game objective in response to a first winning result in game play of the first game.

16. The method of claim 15, further comprising awarding a monetary reward to a game player in response to a second winning result in game play of the first game via the payout mechanism.

17. The method of claim 11, wherein the first game comprises a reel game in which a single game play results in random selection of a set of symbols for display on the at least one display.

18. The method of claim 11, further comprising advancing progression toward achievement of each of the at least one meta-game objectives in response to an occurrence of at least one predetermined symbol selection within the set of symbols.

19. The method of claim 11, wherein progression in the at least one meta-game is not dependent on received player input.

* * * * *